(12) United States Patent
Koker et al.

(10) Patent No.: US 10,282,812 B2
(45) Date of Patent: May 7, 2019

(54) PAGE FAULTING AND SELECTIVE PREEMPTION

(71) Applicant: Intel Corporation, Santa Clara, CA (US)

(72) Inventors: Altug Koker, El Dorado Hills, CA (US); Ingo Wald, Salt Lake City, UT (US); David Puffer, Tempe, AZ (US); Subramaniam M. Maiyuran, Gold River, CA (US); Prasoonkumar Surti, Folsom, CA (US); Balaji Vembu, Folsom, CA (US); Guei-Yuan Lueh, San Jose, CA (US); Murali Ramadoss, Folsom, CA (US); Abhishek R. Appu, El Dorado Hills, CA (US); Joydeep Ray, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 15/482,808

(22) Filed: Apr. 9, 2017

(65) Prior Publication Data
US 2018/0293692 A1    Oct. 11, 2018

(51) Int. Cl.
*G06F 9/30* (2018.01)
*G06F 9/38* (2018.01)
(Continued)

(52) U.S. Cl.
CPC .............. *G06T 1/20* (2013.01); *G06F 9/3009* (2013.01); *G06F 9/30185* (2013.01);
(Continued)

(58) Field of Classification Search
None
See application file for complete search history.

(56) References Cited

U.S. PATENT DOCUMENTS

2013/0155077 A1    6/2013   Hartog
2014/0109102 A1*   4/2014   Duncan ................ G06F 9/3851
                                                                 718/103
(Continued)

FOREIGN PATENT DOCUMENTS

EP          3401874 A1   11/2018
WO       2017003697 A1    1/2017

OTHER PUBLICATIONS

Goodfellow, et al. "Adaptive Computation and Machine Learning Series", Book, Nov. 18, 2016, pp. 98-165, Chapter 5, The MIT Press, Cambridge, MA.
(Continued)

*Primary Examiner* — Kee M Tung
*Assistant Examiner* — Yanna Wu
(74) *Attorney, Agent, or Firm* — Jaffery Watson Mendonsa & Hamilton LLC

(57) ABSTRACT

One embodiment provides for a parallel processor comprising a processing array within the parallel processor, the processing array including multiple compute blocks, each compute block including multiple processing clusters configured for parallel operation, wherein each of the multiple compute blocks is independently preemptable. In one embodiment a preemption hint can be generated for source code during compilation to enable a compute unit to determine an efficient point for preemption.

20 Claims, 36 Drawing Sheets

(51) Int. Cl.
  *G06F 9/46* (2006.01)
  *G06F 9/48* (2006.01)
  *G06T 1/20* (2006.01)
(52) U.S. Cl.
  CPC ............ *G06F 9/3851* (2013.01); *G06F 9/461* (2013.01); *G06F 9/4843* (2013.01)

(56) References Cited

U.S. PATENT DOCUMENTS

2014/0184617 A1 7/2014 Palmer
2016/0062947 A1 3/2016 Chetlur et al.

OTHER PUBLICATIONS

Ross, et al. "Intel Processor Graphics: Architecture & Programming", Power Point Presentation, Aug. 2015, 78 pages, Intel Corporation, Santa Clara, CA.
Shane Cook, "CUDA Programming", Book, 2013, pp. 37-52, Chapter 3, Elsevier Inc., Amsterdam Netherlands.
Nicholas Wilt, "The CUDA Handbook; A Comprehensive Guide to GPU Programming", Book, Jun. 22, 2013, pp. 41-57, Addison-Wesley Professional, Boston, MA.
Stephen Junking, "The Compute Architecture of Intel Processor Graphics Gen9", paper, Aug. 14, 2015, 22 pages, Version 1.0, Intel Corporation, Santa Clara, CA.
Notification of CN Publication for Application No. 201810310215.1 (Pub No. 108694691), Oct. 23, 2018, 85 pages.
Extended European Search Report, Application No. EP18159601, 7 pages, Oct. 4, 2018.

\* cited by examiner

PAGE FAULTING AND SELECTIVE PREEMPTION

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture; groups of parallel threads attempt to execute program instructions synchronously together as often as possible to increase processing efficiency.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

DETAILED DESCRIPTION

Figure 1:
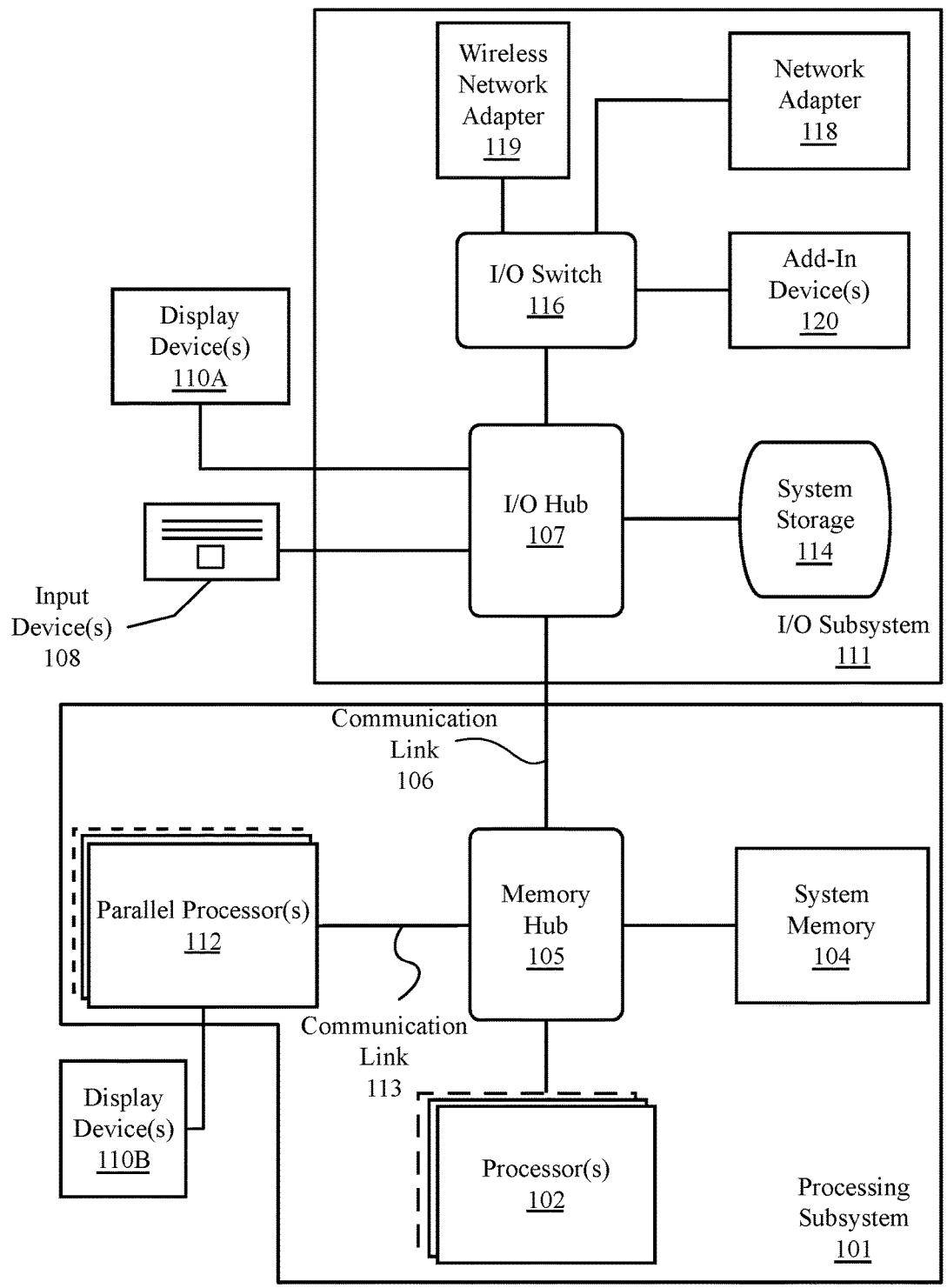
FIG. 1 is a block diagram illustrating a computer system configured to implement one or more aspects of the embodiments described herein.

In some embodiments, a graphics processing unit (GPU) is communicatively coupled to host/processor cores to accelerate graphics operations, machine-learning operations, pattern analysis operations, and various general purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

A page fault can occur on a GPGPU in response to an instruction's attempt to access an invalid virtual address or a virtual address that is not mapped to a physical address. For example, GPU oversubscription can be implemented in which a virtual address space addressable by the GPU includes GPU local memory as well as system memory associated with host processors of a host data processing system. When accessing a virtual address that is not currently mapped to a physical memory address a page fault can occur to load the page into the relevant virtual address space.

This may include simply mapping a virtual address to a region of local physical memory or can include an additional operation to loading the page from system memory into a local physical memory address. The page fault invokes a page fault handler that establishes the proper virtual to physical mapping and either resumes execution of the faulting instruction or signals an error if the address is invalid.

If servicing the page fault will cause significant delay the GPU may switch contexts to a context associated with another process or thread. The context switch results in state information being stored until the state information is needed in response to a subsequent context switch. Performing a full GPU context switch can be significantly time consuming, however. The entire hardware content is saved and restored and various hardware caches are flushed to prepare to execute a separate context. This process can result tin a significant loss of time from the compute perspective. Additionally, the page fault handling process for the context may require tracking. For example, if a context is switched out to handle a page fault, switching the context back onto the GPU before the page fault is handled can introduce additional delay and hamper computational efficiency.

Embodiments described herein increase the computational efficiency associated with context switching by enabling a GPU to perform preemption as a lower granularity than the entire GPU. In one embodiment the parallel execution blocks of the GPU are divided into compute blocks that define a preemption boundary for hardware resources within the GPU. Upon a page fault affecting a compute block, hardware tracking the execution progress of the compute blocks stops execution and place the compute block into a preemption state. While in the preemption state the hardware context of the compute block is saved to a region in memory that is designated for use by the compute block. While the compute block is in the preemption state, other compute blocks on the GPU can continue to execute instructions. Once the hardware context of the compute block is saved to memory, scheduling hardware for the GPU can load a new workgroup onto the compute block. The work group can be from the same context or, in embodiments in which the GPU supports multiple simultaneous contexts, the scheduler can load a work group for an alternative context onto the preempted compute block.

As an additional optimization, in one embodiment the scheduler hardware of the GPU can track the execution state of active workgroups for a given context. When all workgroups of the context are complete excepting the page faulted and pre-empted work groups associated with the context, the scheduler hardware can preempt compute blocks associated with other active contexts on the GPU and reload the previously faulted and preempted context to complete the final outstanding work groups of that context. The reload process is particularly efficient for embodiments in which the GPU is configured to execute multiple contexts simultaneously.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated.

Figure 2A:
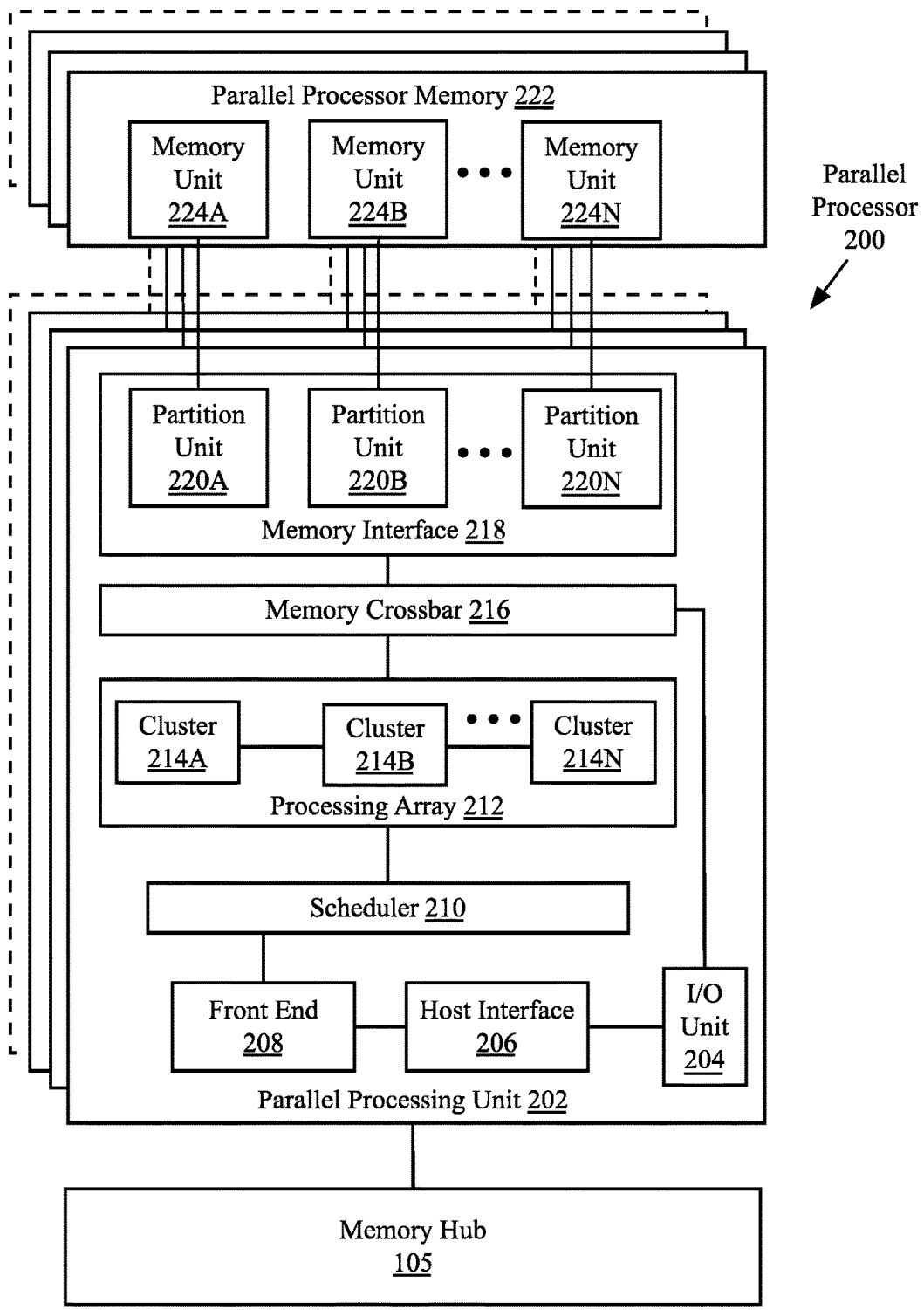
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
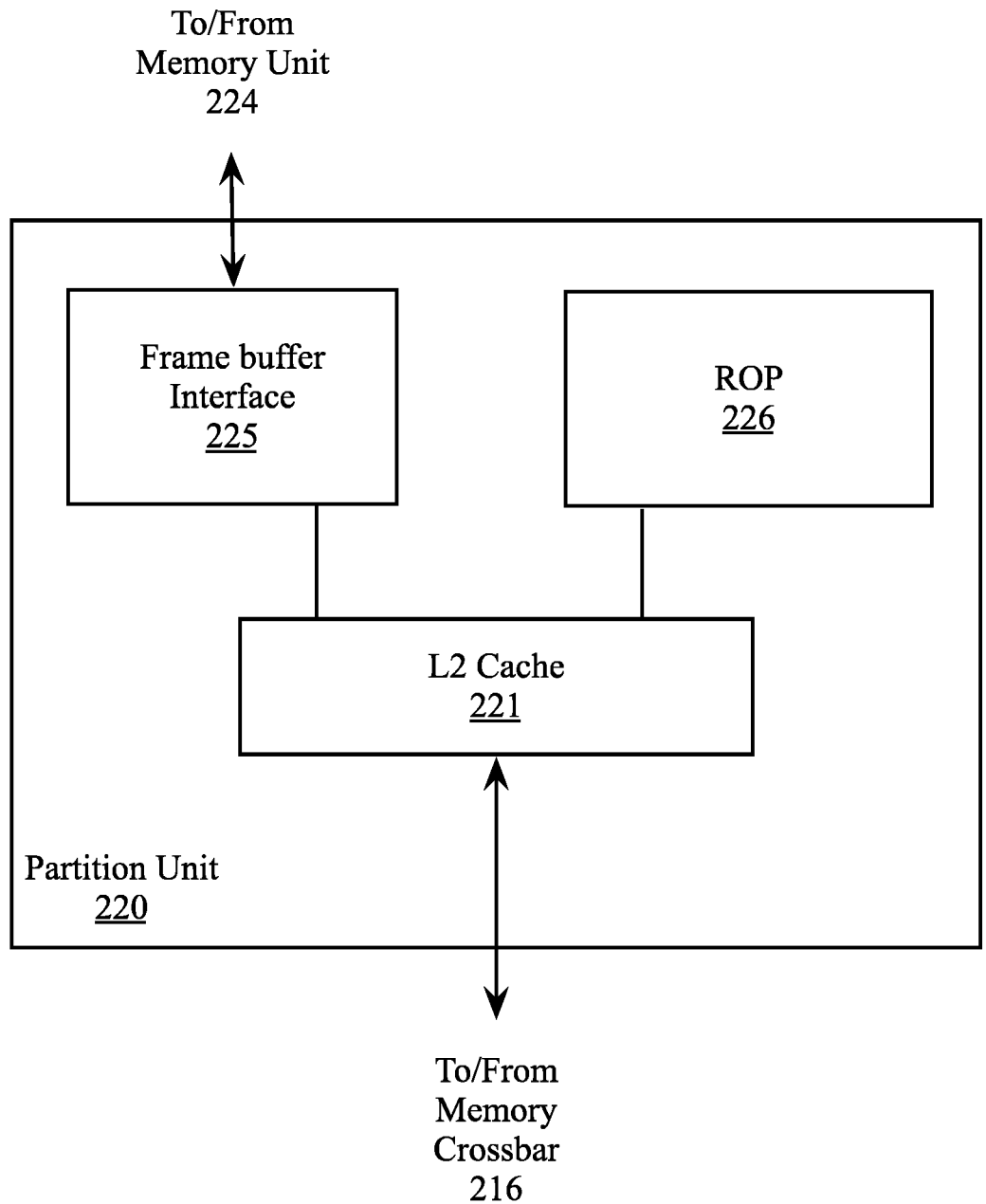

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
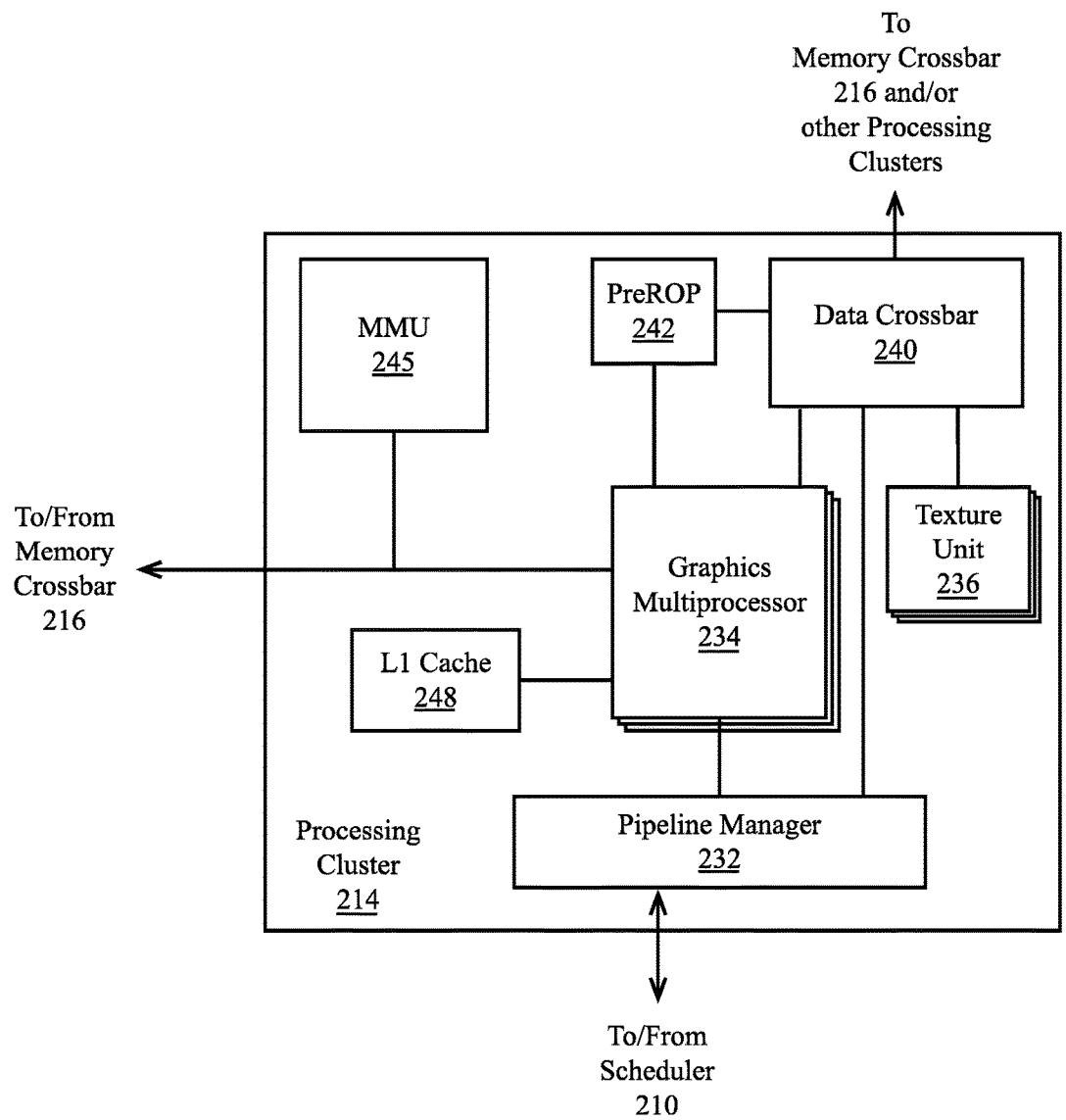

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
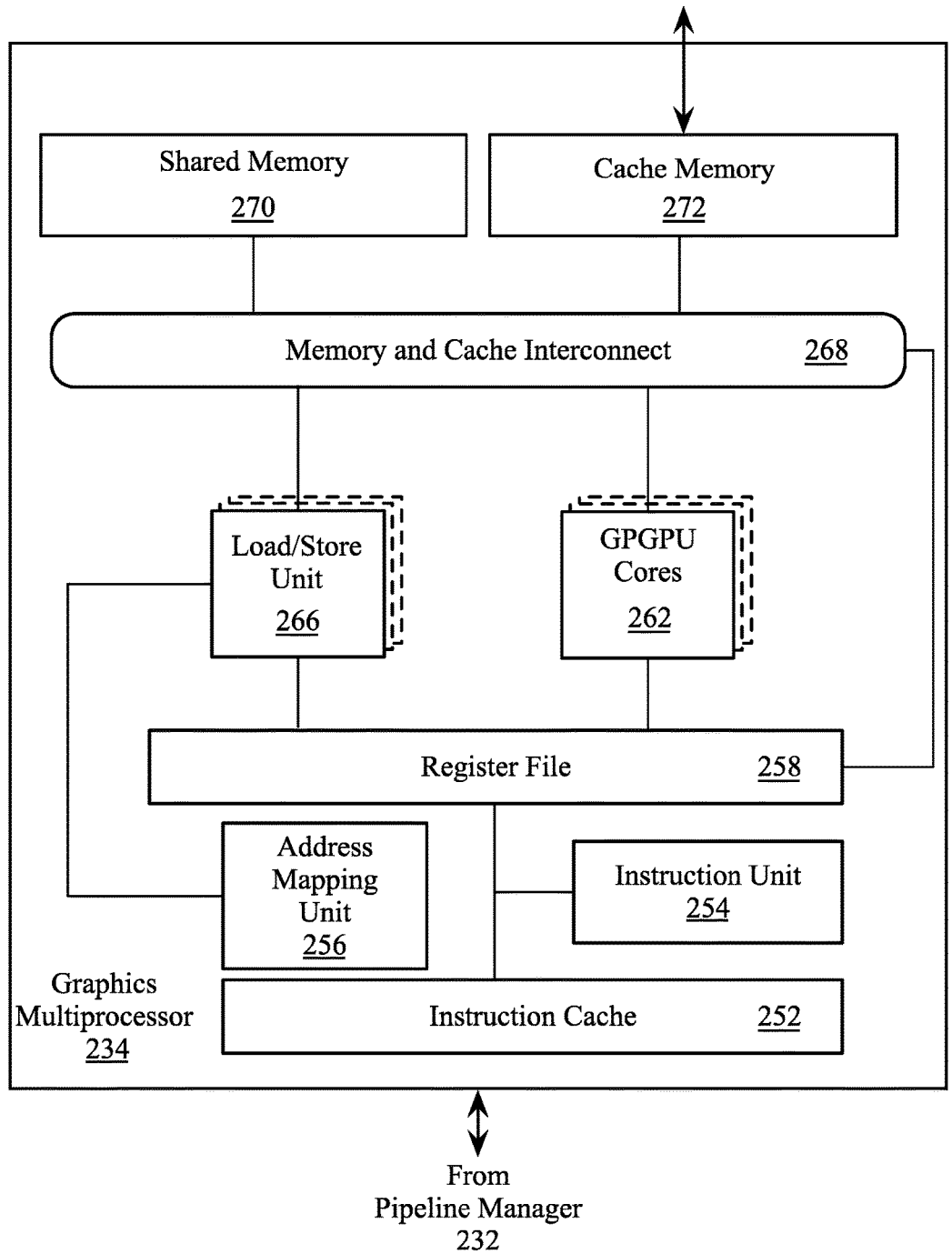

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. In one embodiment one or more of the GPGPU cores can also include fixed or special function logic The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. shared memory 270 can be used to enable communication between threads that execute on the functional units within the graphics multiprocessor 234. The cache memory 272 can be used as a data cache for example, to cache texture data communicated between the functional units and the texture unit 236.

Figure 3A:
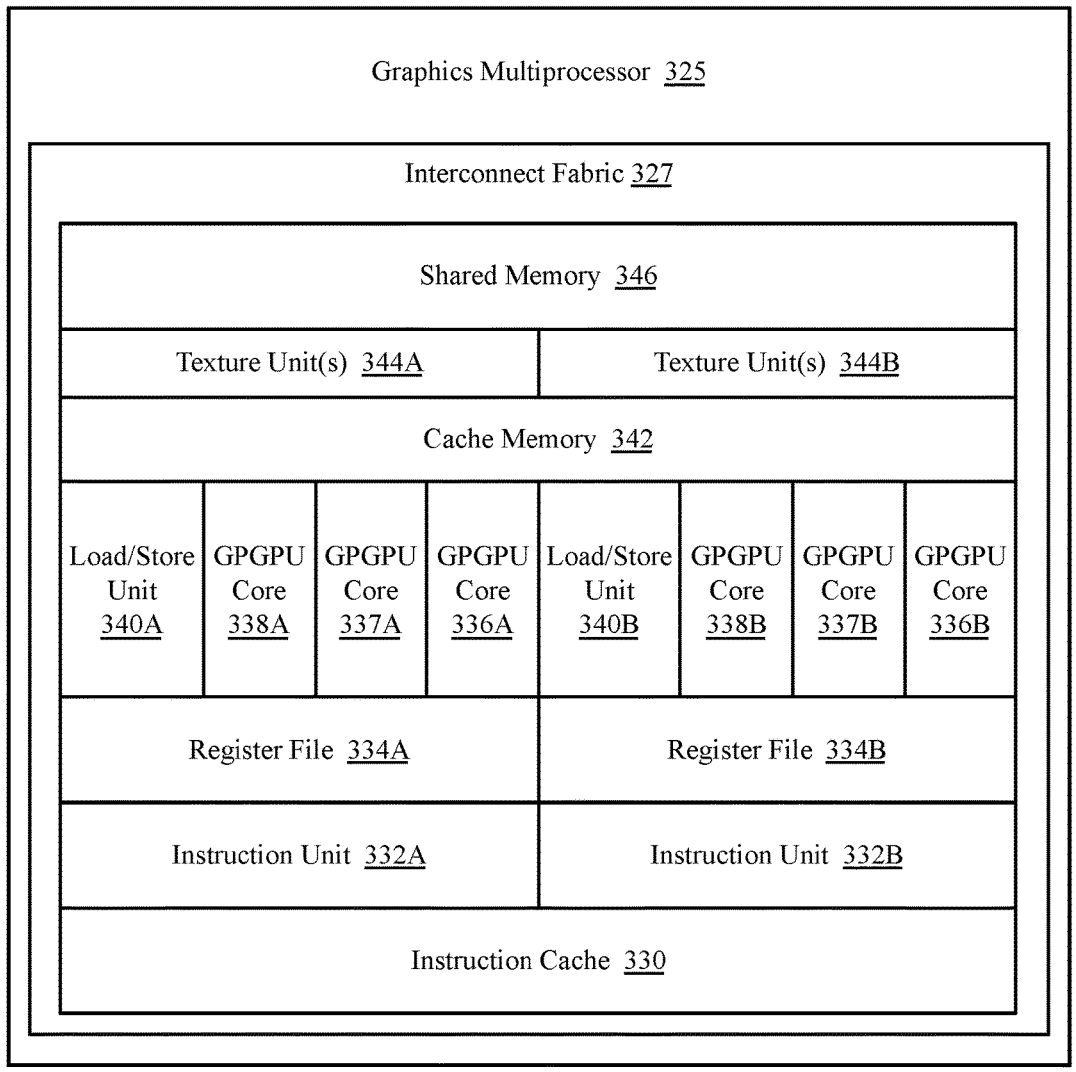
FIG. 3A-3B are block diagrams of graphics multiprocessors, according to embodiments.
Figure 3B:
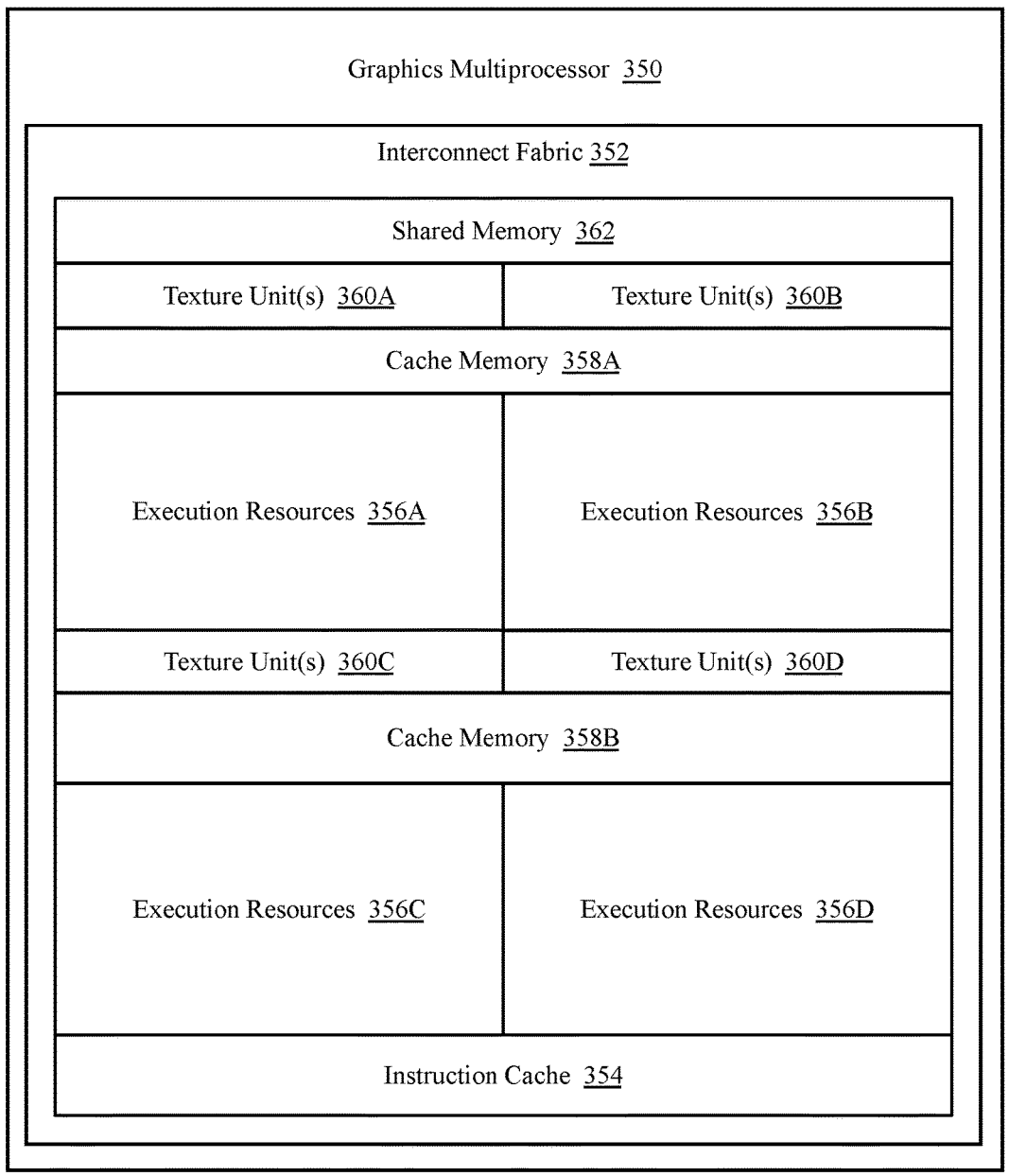

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346. The various components can communicate via an interconnect fabric 327. In one embodiment the interconnect fabric 327 includes one or more crossbar switches to enable communication between the various components of the graphics multiprocessor 325.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
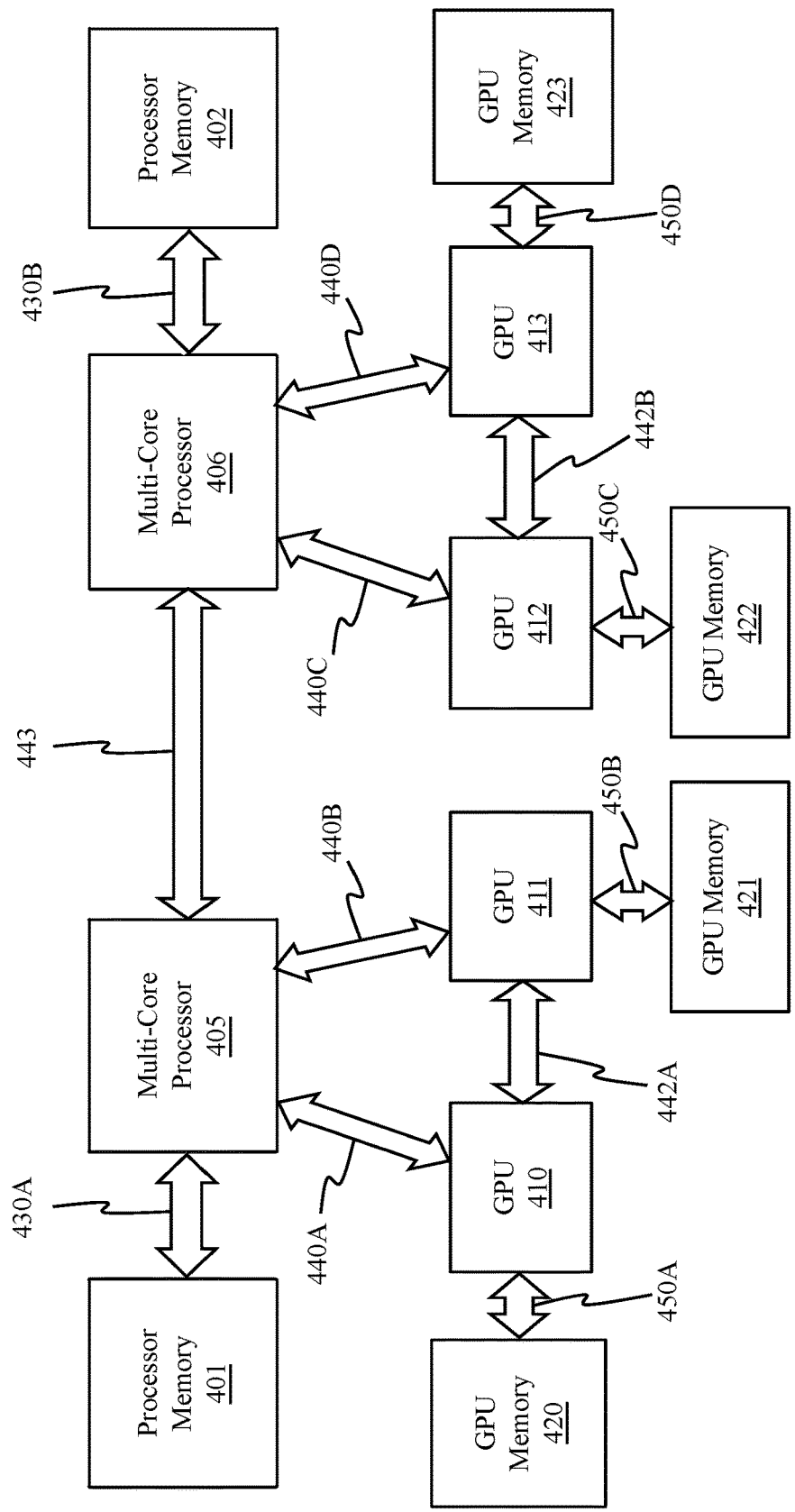
FIG. 4A-4F illustrate an exemplary architecture in which a plurality of GPUs are communicatively coupled to a plurality of multi-core processors.

FIG. 4A illustrates an exemplary architecture in which a plurality of GPUs 410-413 are communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
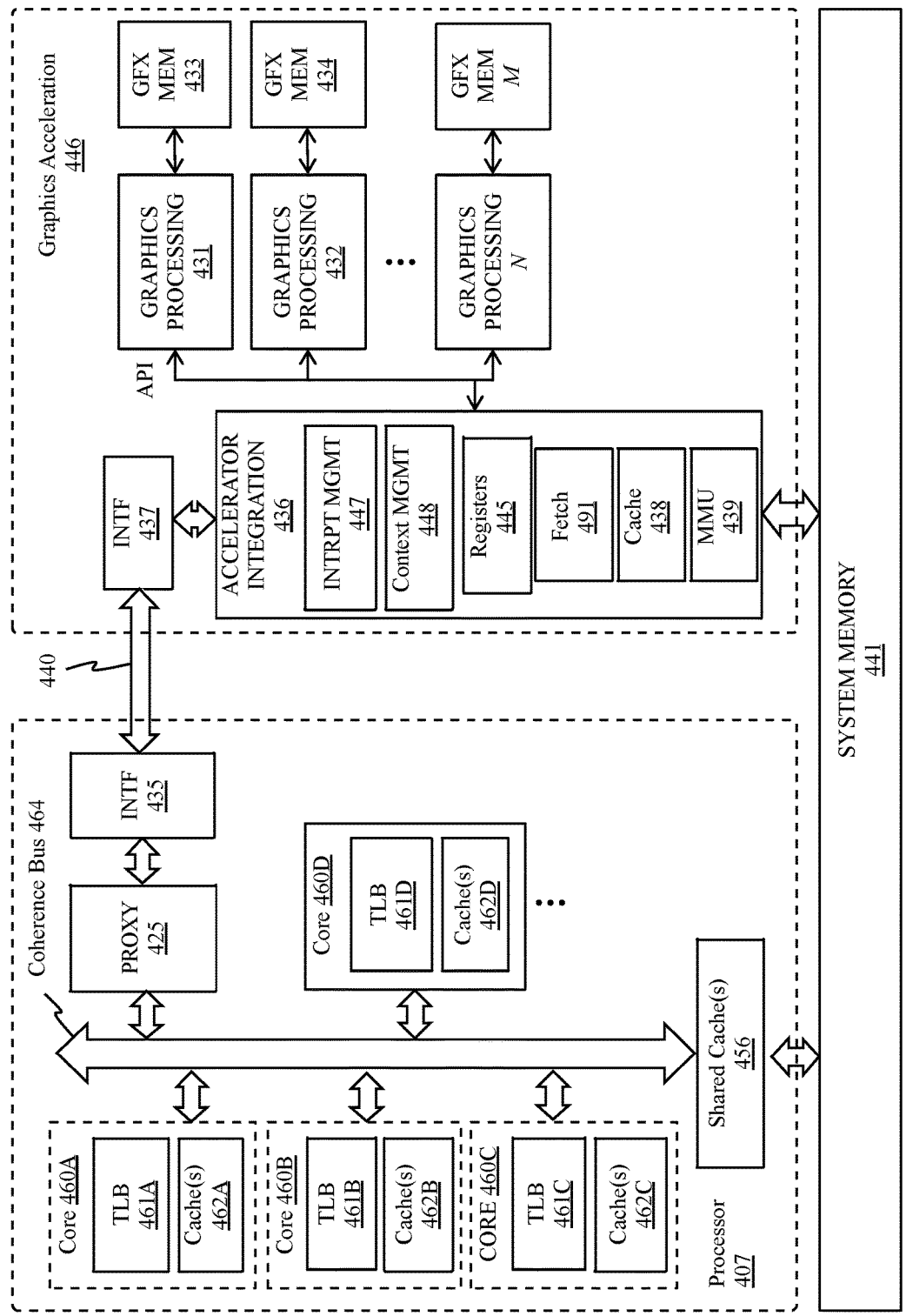

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
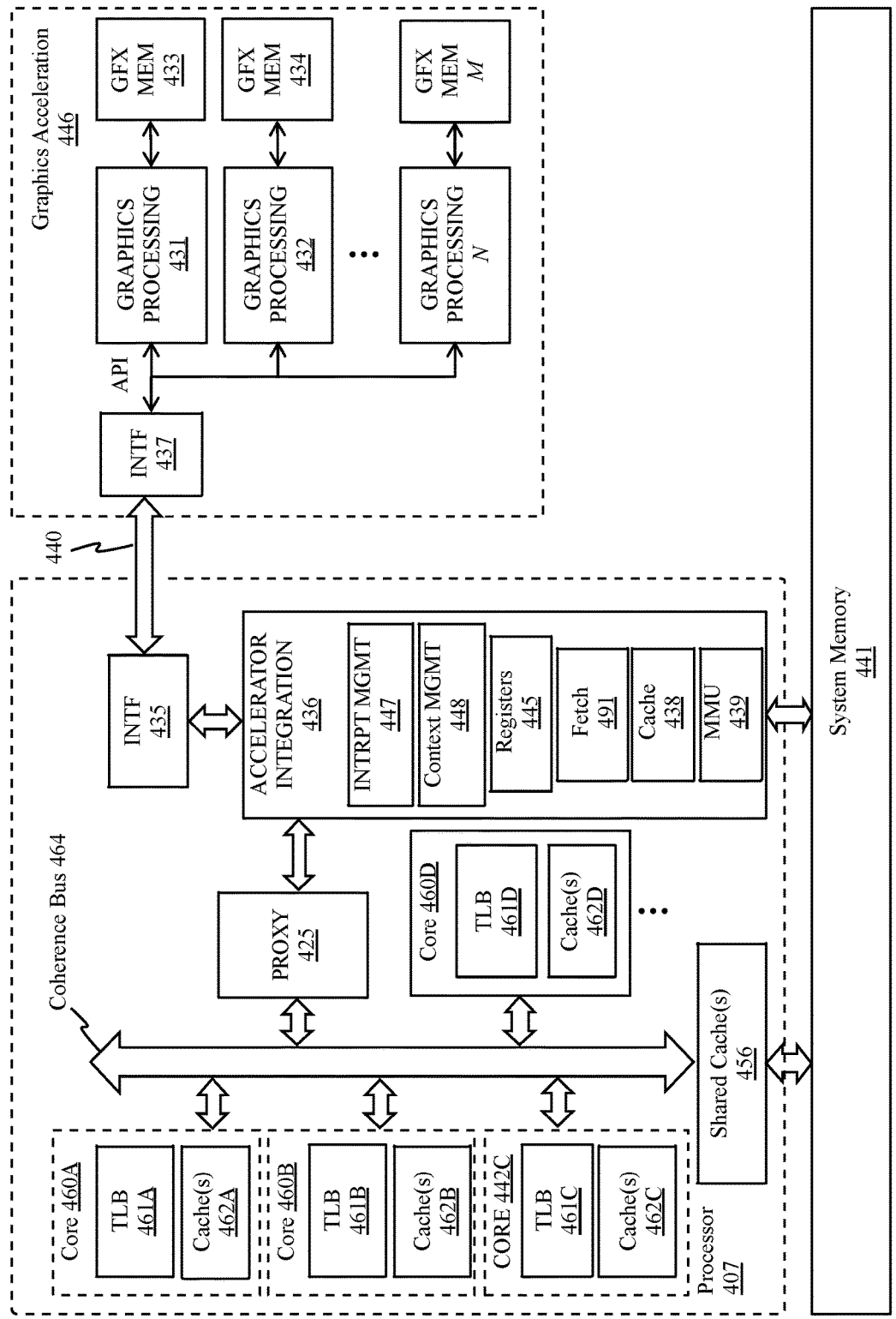

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
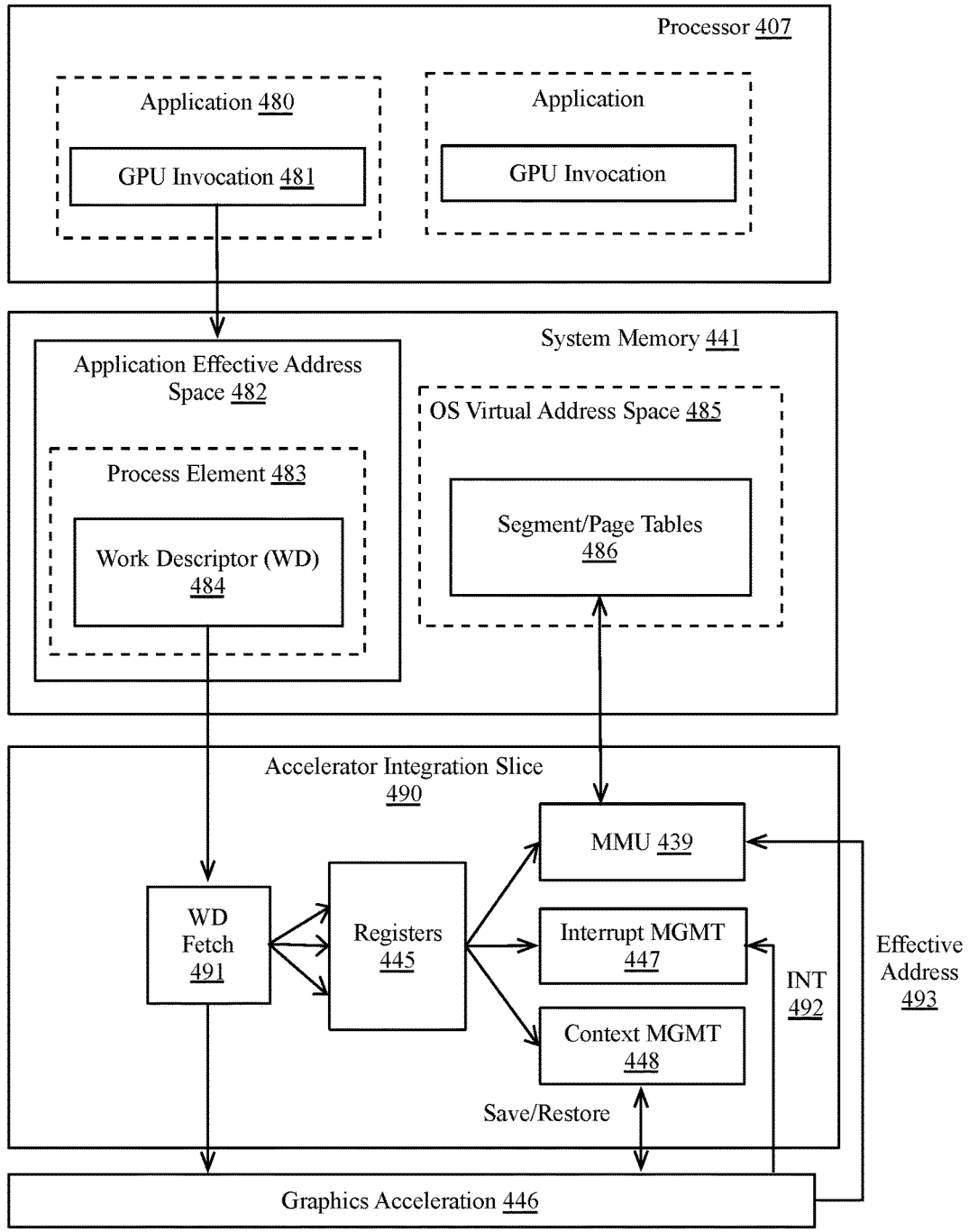

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by the operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
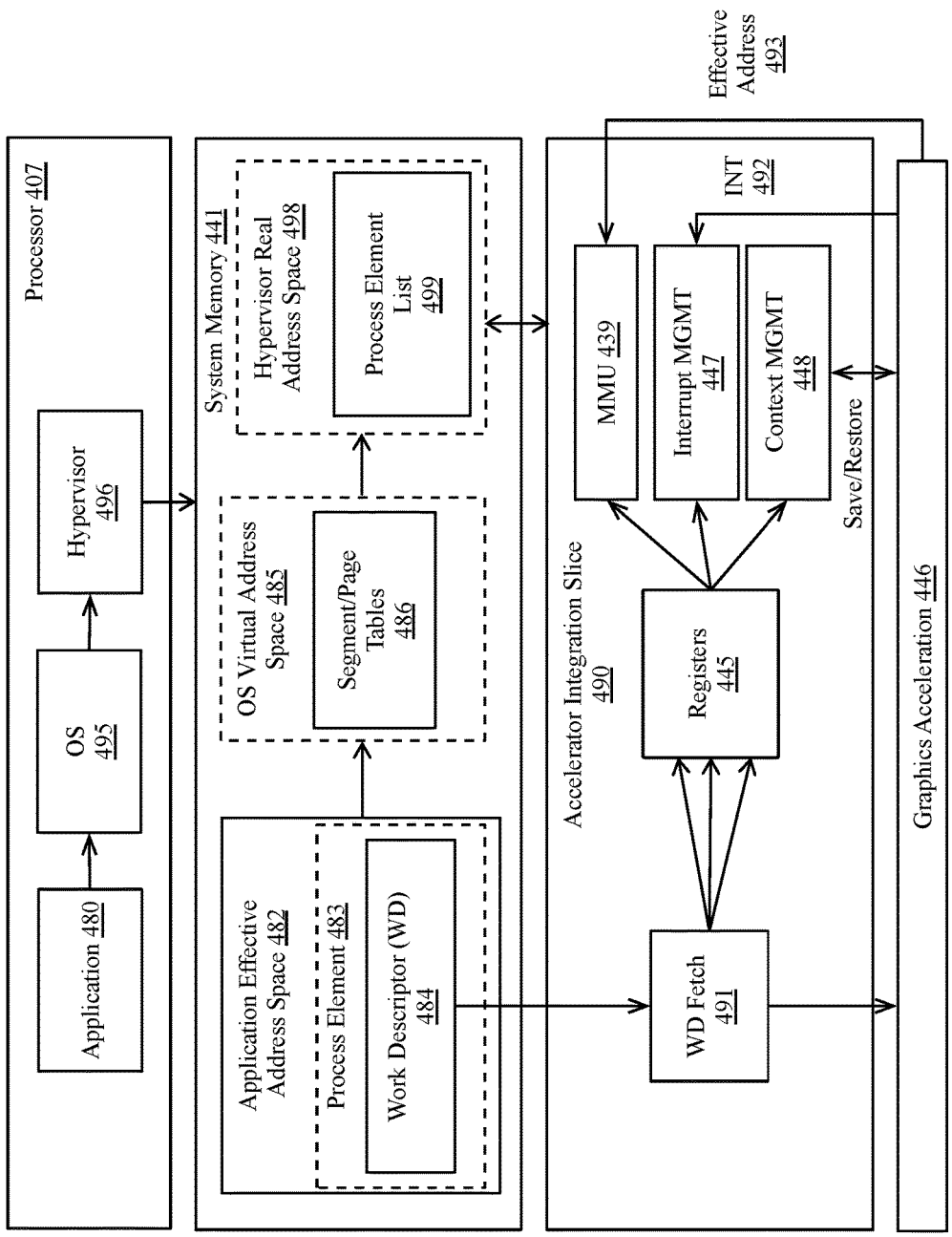

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1 A work descriptor (WD)
2 An Authority Mask Register (AMR) value (potentially masked).

TABLE 3-continued

OS to Hypervisor Call Parameters

3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)
8 Interrupt vector table, derived from the hypervisor call parameters.
9 A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 490 registers 445.

Figure 4F:
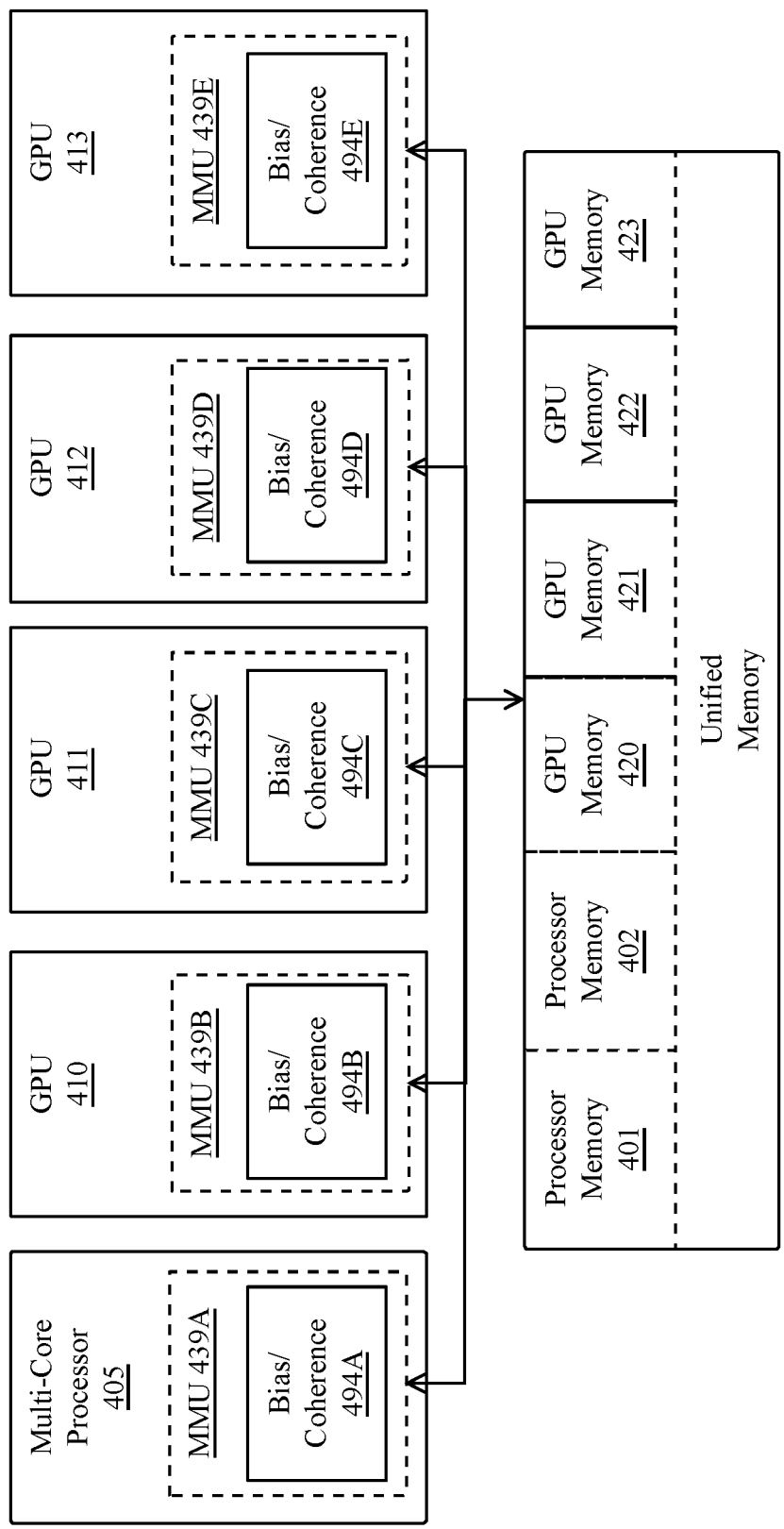

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
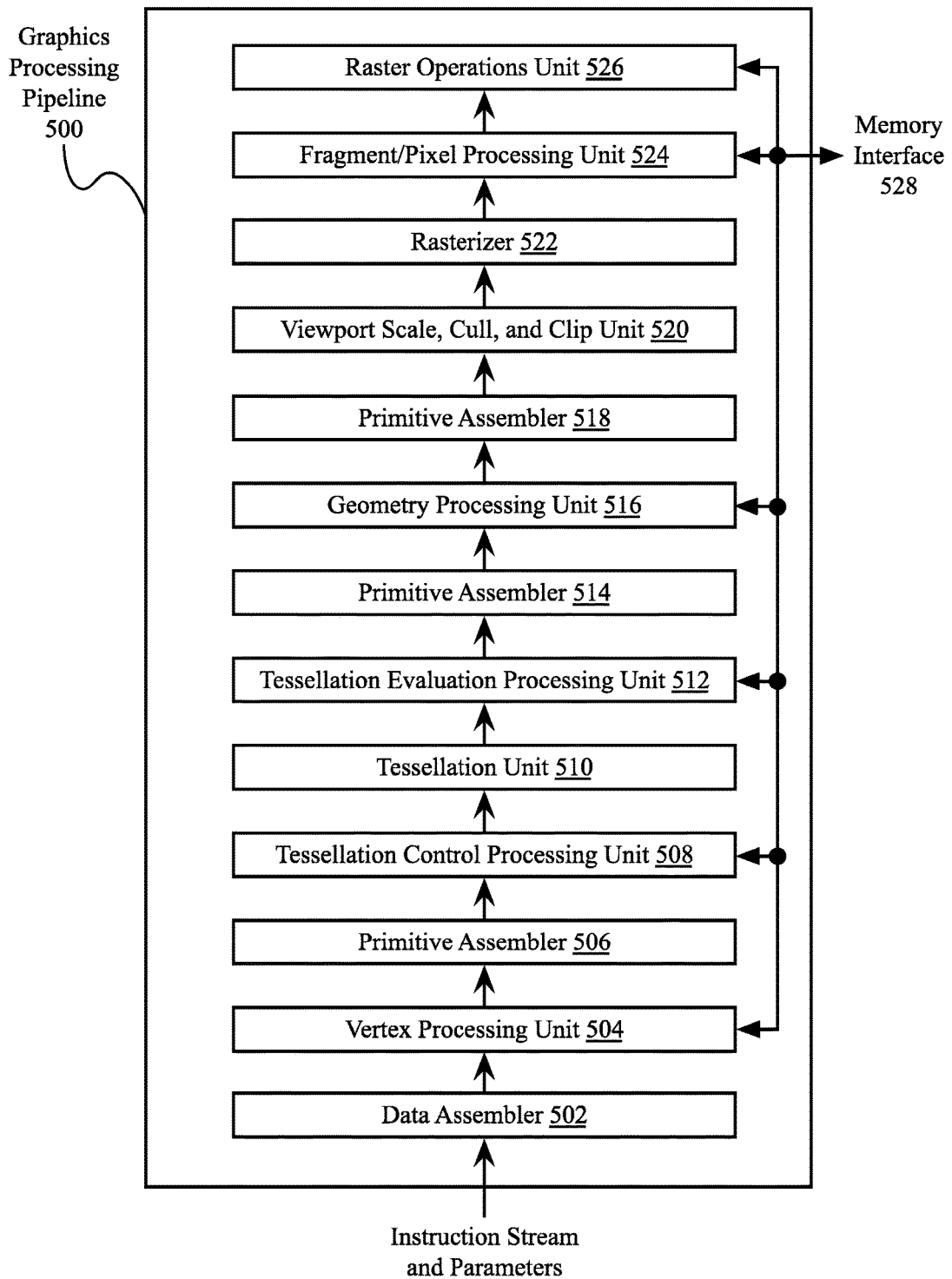
FIG. 5 is a conceptual diagram of a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Page Faulting Preemption at Lower Level Hierarchy

Figure 6:
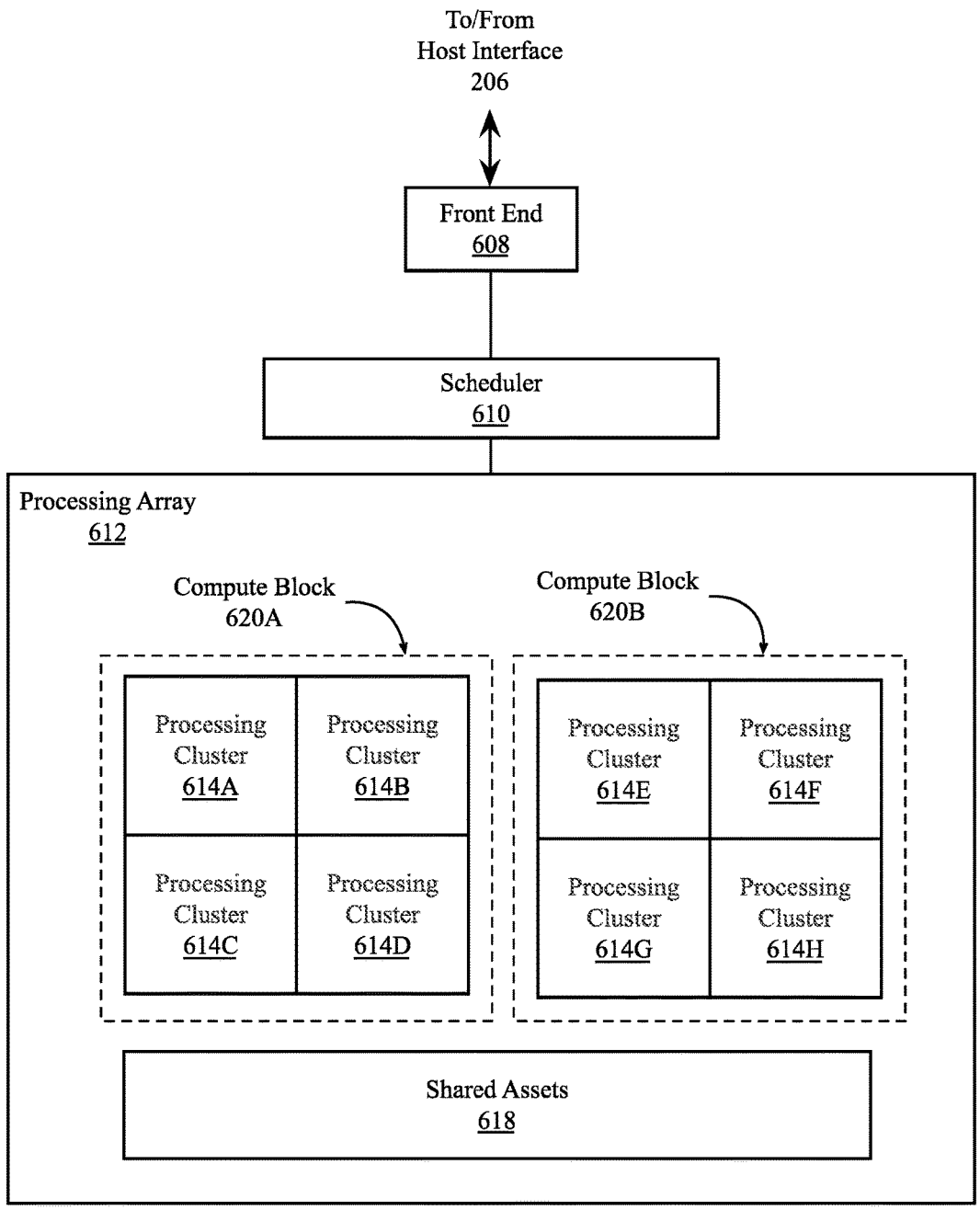
FIG. 6 illustrates a subsystem for executing threads within a single-instruction multiple-data (SIMD) computation system, according to an embodiment.

FIG. 6 illustrates a subsystem 600 for executing threads within a single-instruction multiple-data (SIMD) computation system, according to an embodiment. The subsystem 600 includes a front end 608, a scheduler 610, and a processing array 612, which, in one embodiment, are respective instances of the front end 208, scheduler 210, and processing array 212 shown in FIG. 2A. In such embodiment, the front end is in communication with a host interface, such as the host interface 206 of FIG. 2A. The processing array 612 includes processing clusters 614A-614H, which can each be an instance of the processing cluster 214 of FIG. 2A and FIG. 2C.

In one embodiment the processing clusters 614A-614H are grouped into compute blocks 620A-620B. For example, processing cluster 614A-614D can be grouped into compute block 620A, while processing cluster 614E-614H can be grouped into compute block 620B. However, the illustrated grouping of processing clusters and compute blocks is exemplary, as any number of compute blocks and processing clusters can be included in the processing array 612. The compute blocks 620A-620B are configured as preemption group, such that the processing clusters within any given compute block can be context switched without impacting the execution of processing clusters in a different compute block. For example, if a thread executing on any of processing clusters 614A-614D within compute block 620A triggers a page fault or incurs any other form of memory access related execution delay, the current state for the work group associated with the thread can be saved and a new work group can be loaded onto the compute block 620A without impacting the execution of work groups executing on compute block 620B.

The processing clusters 614A-614H of the compute blocks 620A-620B can execute a large number of threads in parallel while utilizing a set of shared assets 618. The shared assets 618 can include hardware resources such as texture units, texture samplers, and cache memories. The shared assets 618 can additional include address generation units and address mapping units to enable the processing clusters 614A-614H to access local memory and system. During thread execution various state and context information for the shared assets 618 is generated. Additionally, each of the processing clusters 614A-614H can have associated internal state that is generated or modified during instruction execution. When a context switch is triggered for any of the compute blocks 620A-620B, the context information for the internal state of the processing clusters within the compute block as well as the context state associated with the portion of the shared assets 618 accessed by the compute block, can be saved and execution can be halted only for the affected compute block.

Figure 7:
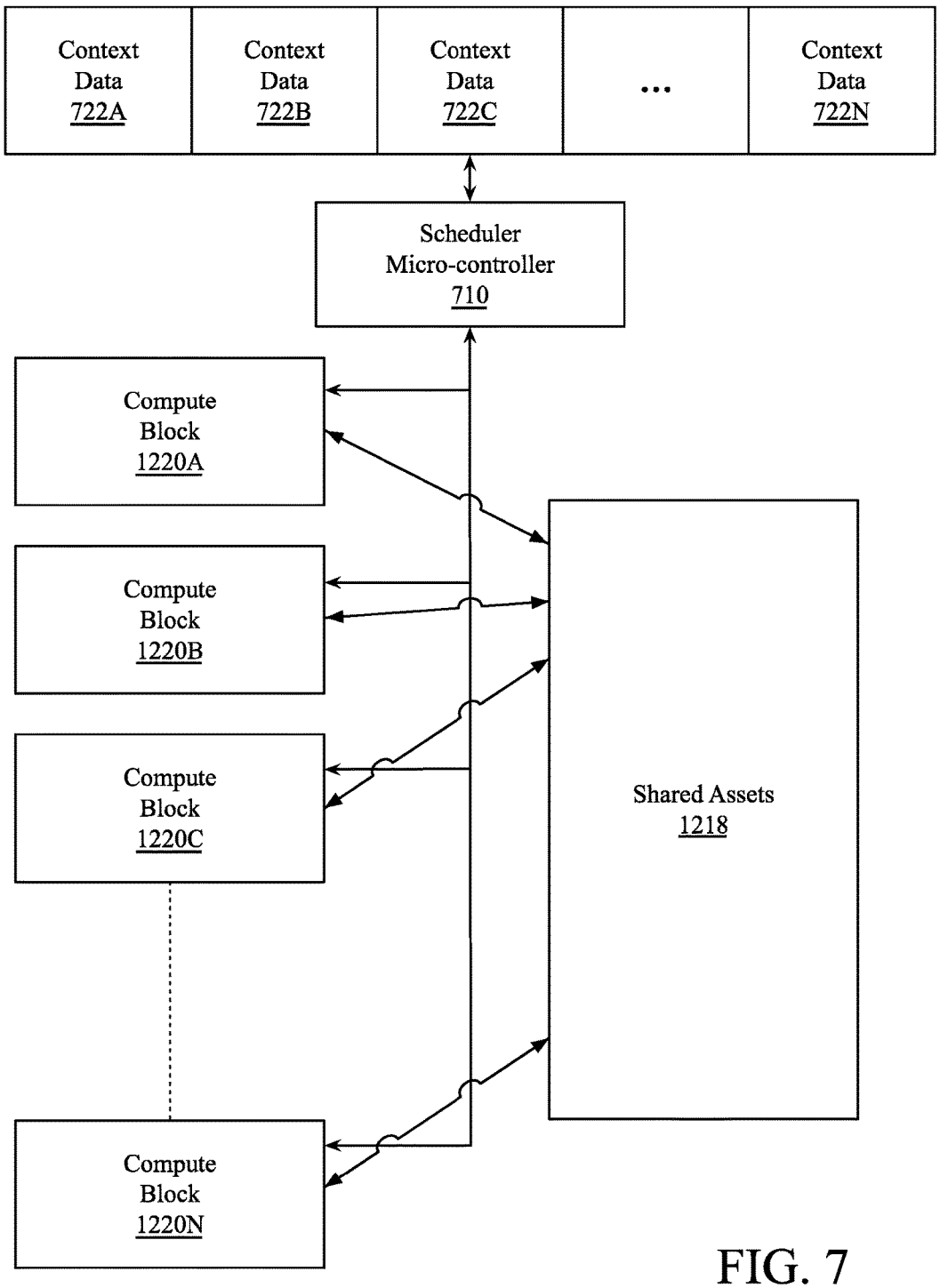
FIG. 7 is a block diagram for an execution subsystem within a processing array of a GPGPU, according to an embodiment.

FIG. 7 is a block diagram for an execution subsystem 700 within a processing array of a GPGPU, according to an embodiment. The execution subsystem 700 enables fine grain preemption within a GPGPU by allowing individual portions of the GPGPU to be context switched while other portions of the GPGPU continue to execute. Additionally, in some embodiments the GPGPU supports execution of multiple simultaneous contexts, enabling multiple applications to simultaneously render graphics data or perform general purpose computational operations. Additionally the GPGPU may be configured to perform simultaneous execution of graphics and compute instructions.

In some embodiments the execution subsystem 700 includes an embedded microcontroller (e.g., scheduler micro-controller 710) configured to execute firmware logic to perform scheduling operations for compute block 620A-620N. The firmware of the scheduler micro-controller 710 can enable complex scheduling behavior for at least a portion of the GPGPU. In one embodiment the scheduler micro-controller 710 is configured to schedule and manage the execution of work items and work groups within the execution subsystem 700. In various embodiments the work items and work groups executed can include threads, thread groups, thread blocks, thread warps, cooperative thread arrays, or any other grouping or arrangement of instructions. During execution, the various execution resources within each compute block 620A-620N can make use of shared assets 618, as described in FIG. 6. The work groups and associated work items can be scheduled at various degrees of granularity across embodiments. The degree of granularity can vary, for example, based on the number of execution resources (e.g., processing clusters, graphics multiprocessors, etc.) associated with each compute block 620A-620N. In other words, while the compute blocks 620A-620N can define the preemption boundaries at which execution resources may be preempted, depending on the specific embodiment the compute block 620A-620N may not define the scheduling granularity at which the scheduler micro-controller 710 can dispatch work items for execution.

During execution, one or more thread executing on the compute blocks 620A-620N can encounter page faults. In one embodiment once the number of page faults within a compute block exceeds a threshold the compute block is transitioned into a preemption ready state. In one embodiment the page fault threshold is defined as a percentage of the number of threads executing on a compute block. For example and in one embodiment, the threshold is defined as one third of the threads executing on the compute block. In one embodiment the threshold is defined as one half of the threads executing on the compute block. However, the specific threshold value can vary across embodiments. In one embodiment the page fault threshold is configurable.

Execution of threads for the execution resources (processing clusters, graphics multiprocessors, etc.) is halted and the context state for the work group executing on the compute block is saved. Once the execution resources within the compute block terminate execution the context state for the executing work group can be saved to memory. In one embodiment the scheduler micro-controller 710 can copy the state information to context data 722A-722N regions in a context save memory that is reserved for each of the respective compute blocks 620A-620N. The context data 722A-722N regions can store internal state for the execution resources within each compute block 620A-620N, as well as the context data for the portion of the shared assets 618 used by the compute blocks to execute work groups. In one embodiment the execution subsystem 700 supports execution of multiple simultaneous contexts. For example, compute block 620A can execute rendering or compute operations for a first application while compute block 620B can execute rendering or compute operations for a second application. The number of supported active contexts can vary across embodiments.

Under some circumstances, overly aggressive preemption may result in a reduction, rather than an increase in overall system performance. If preemption is performed to satisfy a page fault that is quickly resolved, execution efficiency may be reduced. Rapid page fault resolution may occur, for example, when servicing a soft page fault. A soft page fault occurs when a page has temporarily been unmapped from virtual memory but the data in memory is still valid. Such page faults may be satisfied by simply remapping the page to the appropriate virtual memory address. Soft page faults differ from hard page faults, for which a memory transfer is required.

In one embodiment the scheduler micro-controller 710 is configured to avoid overly aggressive preemption by monitoring average page fault latency on a per-context basis. The average page fault latency for a context can then be compared against a low-watermark threshold and a high-watermark threshold. When the scheduler micro-controller 710 detects that average page fault latency for a context is below the low-watermark threshold, the scheduler will disable page fault based work group or thread preemption from that context. When the scheduler micro-controller 710 detects that average page fault latency for a context is above the high-watermark threshold, the scheduler can enable page fault preemption for that context. In one embodiment the GPGPU can be configured with a default low-watermark threshold value and high-watermark threshold value. The low and high-watermark threshold values can also be adjusted via configuration software or by driver logic within software executing on a host processor. In one embodiment the watermark threshold values can be stored within hardware registers within the GPGPU. In one embodiment the driver logic can store watermark threshold values within memory.

Figure 8A:
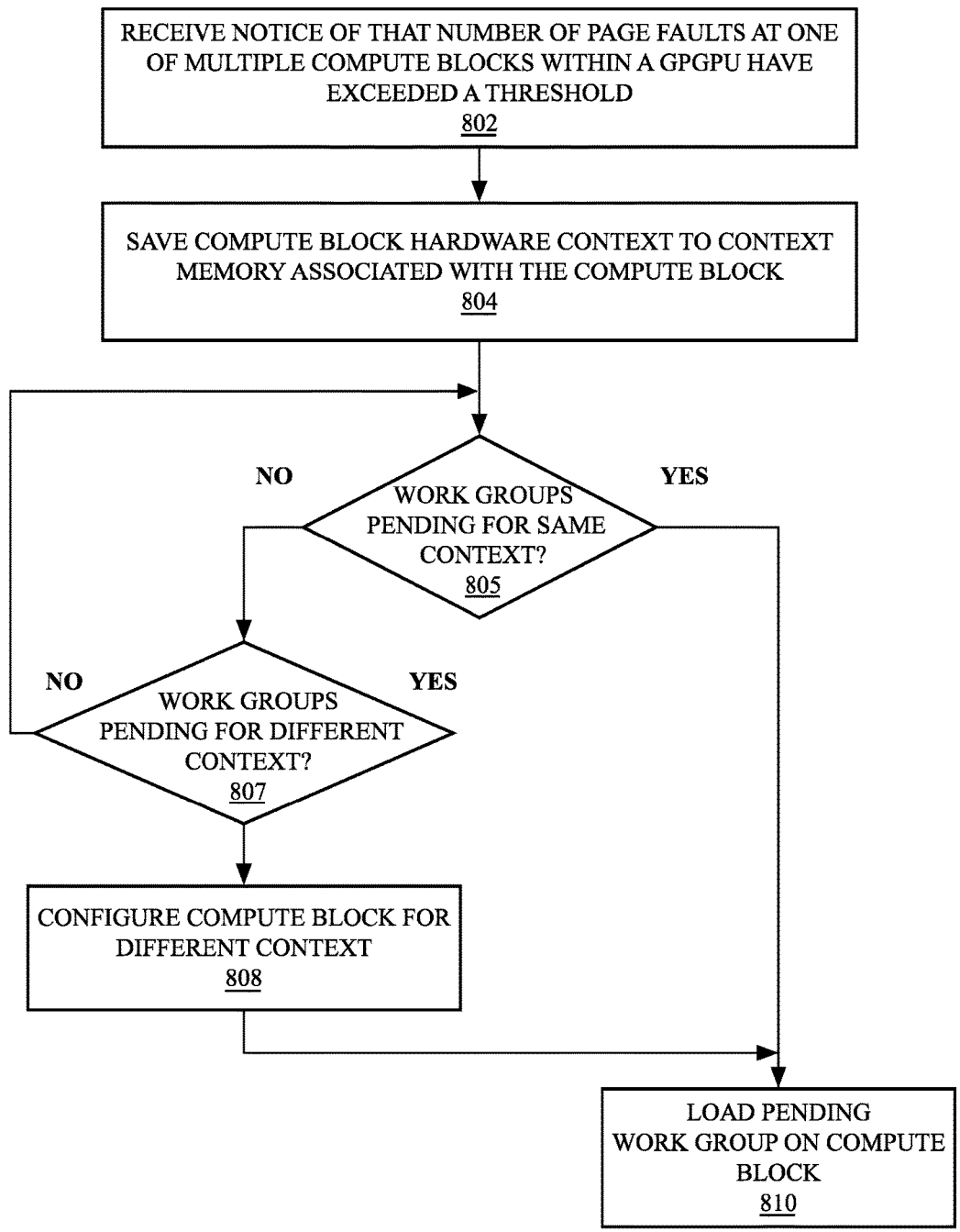
FIG. 8A-8B are a flow diagrams of logic to perform fine grained context switching, according to an embodiment.

FIG. 8A is a flow diagram of execution resource logic 800 to perform fine grained context switching, according to an embodiment. In one embodiment the execution resource logic 800 can be performed by scheduler logic within a GPGPU. In one embodiment the scheduler logic can be implemented by a micro-controller within the GPGPU, such as the scheduler micro-controller 710 of FIG. 7. However, embodiments are not limited to micro-controller based scheduling implementations.

As shown at 802, the execution resource logic 800 can receive a notice that a number of page faults at one of multiple compute blocks within a GPGPU have exceeded a threshold. In one embodiment the execution resource logic 800 can receive the notice from the compute block. In one embodiment the execution resource logic 800 monitors the execution state of the execution resources within the multiple compute blocks and takes notice of any execution blocking events associated with those execution resources. The specific value of the threshold associated with the number of page faults can vary across embodiments. In one embodiment a page fault threshold is predefined within hardware. In one embodiment a page fault threshold is dynamically configured based on the number of work items and/or work groups that are pending execution.

As shown at 804, the execution resource logic 800 can save the hardware context of the faulted compute block to context memory associated with the compute block. The saved hardware context includes all hardware state information for the execution resources within the compute block, as well as any context associated with shared assets used by the compute block, that is necessary to subsequently resume execution of the soon-to-be preempted work group. The precise hardware state that is saved depends on the underlying microarchitecture of the compute resources within the compute blocks and varies across embodiments.

As shown at 805, the execution resource logic 800 can then determine if there are any work groups pending for the same context that was previously being executed. If any work groups for the current same context are pending, the execution resource logic 800 can load the pending work group on the compute block at 810. In one embodiment the GPGPU associated with the execution resource logic 800 supports execution of multiple simultaneous contexts. In such embodiment, if no work groups are pending for the same context at 805, the execution resource logic 800 can determine if work groups are pending for a different context at 807. If no additional work group are pending, the execution resource logic 800 can wait until additional work is ready to be scheduled for the same context at 805 or a different context at 807. If any work groups are pending for a different context at 807, the execution resource logic 800 can configure the compute block to execute the different context at 808, before loading the pending work group on the compute block at 810.

In one embodiment the illustrated operations additionally include an optimization in which contexts having a nearly completed set of workgroups can be given preemption priority. For example, when all workgroups of the context are complete excepting page faulted and previously preempted work groups the scheduler hardware can preempt compute blocks associated with other active contexts on the GPGPU to free execution resources to reload the previously faulted and preempted context. Such optimization may enable more efficient usage of GPGPU resources by allowing nearly completed work to retire and release associated resources.

Figure 8B:
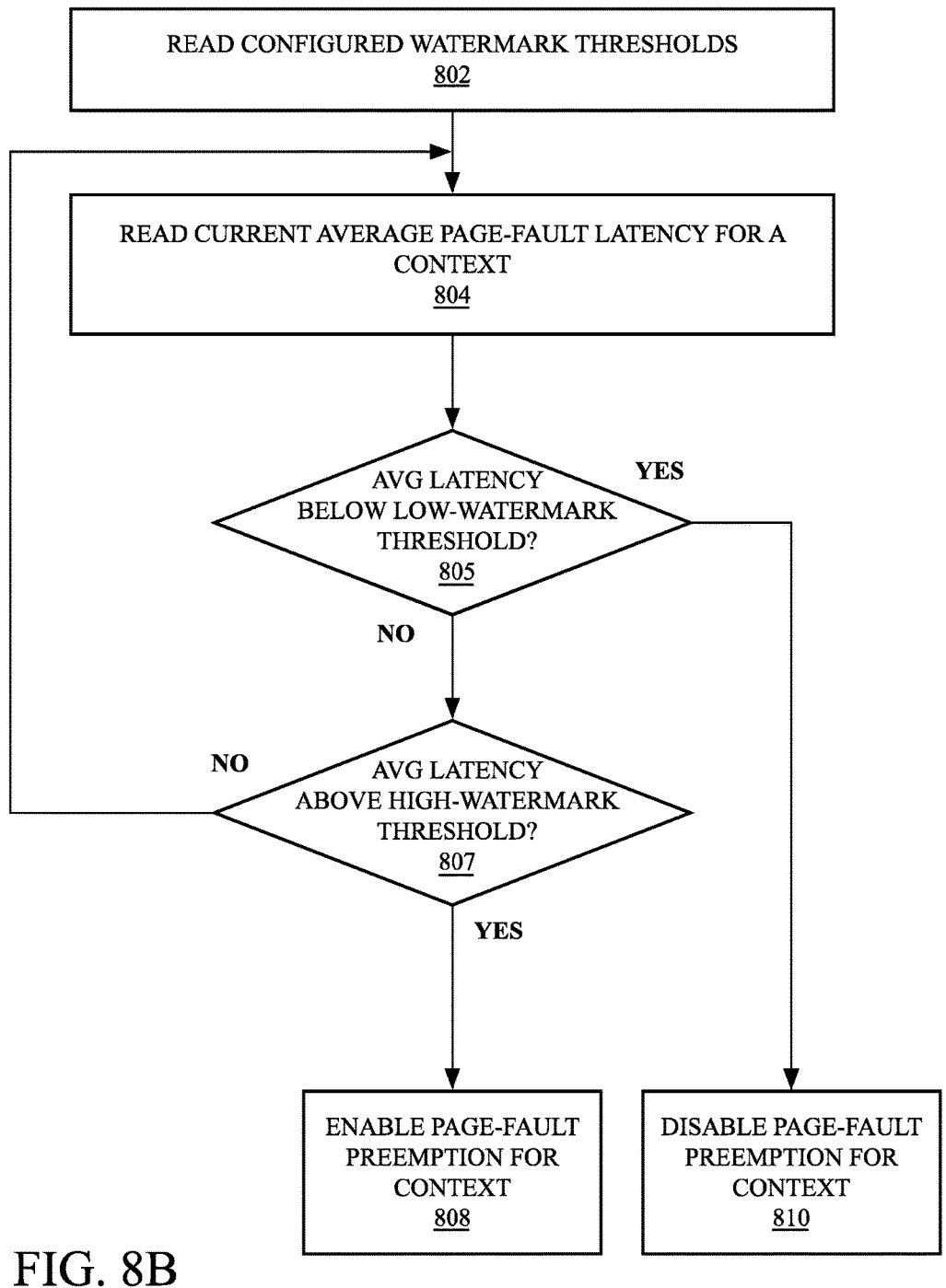

FIG. 8B is a flow diagram of scheduler logic 820 to enable or disable fine grained context switching, according to an embodiment. In one embodiment the scheduler logic 820 is implemented within a scheduler, such as the scheduler micro-controller 710 of FIG. 7. The scheduler logic 820 can read the configured watermark threshold for the GPGPU, as shown at block 802. The configured watermark thresholds include a low-watermark threshold and a high-watermark threshold. In one embodiment the thresholds are read from a hardware register within the GPGPU. In one embodiment the thresholds are supplied by driver logic for the GPGPU. While the thresholds are configurable, one embodiment enables the thresholds to be pre-configured to default values. The scheduler logic 820 can read the average page fault latency of a context, as shown at block 804. If the average page fault latency is below the low-watermark threshold at block 805, the scheduler logic 820 can disable page fault preemption for the context at block 810. If the average page fault latency is above the low-watermark threshold at block 805, the scheduler logic 820 can determine if the average latency is above the high-watermark threshold at block 807. If the average latency is above the high-watermark threshold at block 807, the scheduler logic 820 can enable page fault preemption for the context at block 808.

Selective Preemption Based on Commands or Instruction Type

A GPGPU can have a large number of cores that can support a simultaneous execution of hundreds or thousands of threads. For example, current productized generations can run about 100 threads simultaneously. A GPGPU that supports instruction level preemption when running compute workloads can stop execution at an instruction boundary and save thread state into memory. Depending on the number of resources in use at the time of preemption, a large amount of thread state may be required to be stored to enable instruction level preemption. The amount of thread state that is required to be saved and restored also increases in relation to the total number of supported threads on the GPGPU. In some GPGPU implementations when a preemption request is received the execution resources stop executing, wait for outstanding operations to complete, and saves the current thread state. However, scenarios can occur in which if the execution resources continued to execute a few additional instructions the number of registers in use would be significantly reduced, resulting in a smaller amount of state data to be saved and restored.

In embodiments described herein, a compiler that compiles source code for execution on a GPGPU can generate hints to the GPGPU instruction resources as to potential upcoming changes in the amount of active thread state. The compiler hints, in one embodiment, can indicate the relative efficiency of performing preemption at a given instruction, including whether the instruction is an optimal point to stop execution and save state. The compiler hint can also indicate to the execution resources whether it would be beneficial to continue executing a few additional instructions to reach a more optimal state for preemption. When a preemption request is received for a work group (e.g., thread group, thread block, warp, etc.), on a per thread basis the compute hardware can either stop execution immediately or execute a few additional instructions to reduce the register file footprint.

Figure 9:
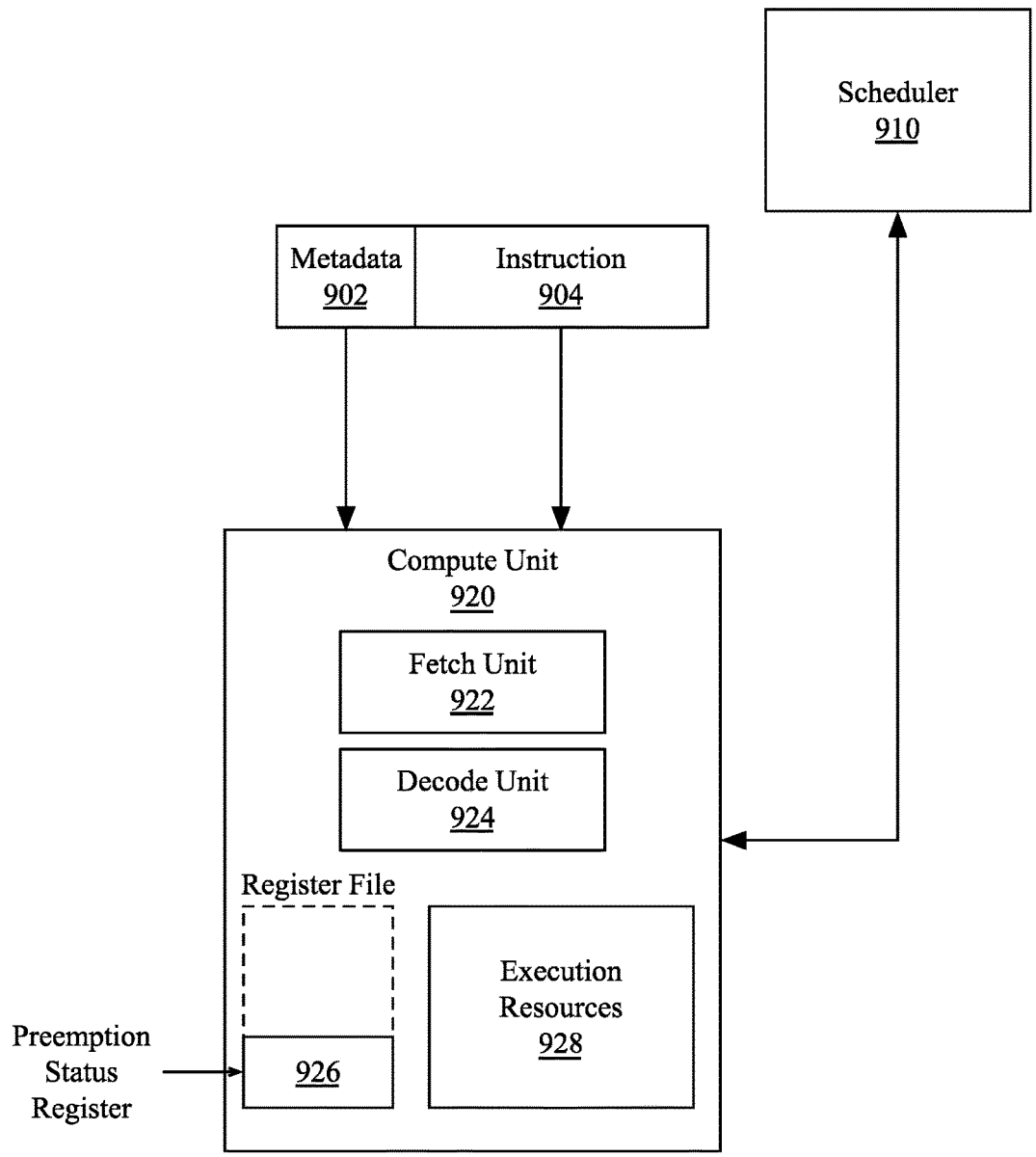
FIG. 9 illustrates an instruction execution system according to an embodiment.

FIG. 9 illustrates an instruction execution system 900 according to an embodiment. In one embodiment the instruction execution system 900 is configured to process metadata 902 and an associated instruction 904 via a compute unit 920. In one embodiment the compute unit 920 is structured in a similar manner as the graphics multiprocessor 400 of FIG. 4. However, the compute unit 920 can be any of the instruction level execution units described herein. The compute unit 920 can include a fetch unit 922 to fetch instruction to execute and a decode unit 924 to decode the fetched instructions. The compute unit 920 additionally includes execution resources 928 having one or more single precision floating point units, double precision floating point units, integer arithmetic logic units, load/store unit, and/or special function units. The metadata 902 and instruction 904 can be generated by a compiler executing on a data processing system. In one embodiment the compiler generates the metadata based on register file usage and other thread state data determined during the compilation process from human readable source code to intermediate language or assembly language that can processed by the GPGPU.

The compute unit 920 can couple with a scheduler 910, which can be scheduler logic within a micro-controller, such as the scheduler micro-controller 710 of FIG. 7. However, embodiments are not limited to micro-controller based schedulers. The scheduler 910 can schedule one or more work groups to the compute unit 920 and can preempt one or more of the executing work groups on the compute unit 920. The scheduler 910 can preempt work groups executing on the compute unit 920 for a variety of reasons. For example, compute workloads on the compute unit 920 can be preempted to maintain balance between compute and graphics rendering operations. Additionally, the scheduler 910 can preempt work groups executing on the compute unit 920 to maintain high utilization, for example, if the number of page faults for threads executing on the compute unit 920 exceeds a threshold.

During operation the fetch unit 922 can fetch the metadata 902 and instruction 904 from an instruction cache. The compute decode unit 924 can then decode the metadata 902 and instruction 904 to determine one or more operations to perform based on the instruction. Decoding the metadata 902 includes parsing a preemption hint for the instruction and determining a status to set to a preemption status register 926 within a register file of the compute unit 920. In one embodiment the preemption status register is a single bit register that stores an OK/NOK value (e.g., 1b/0b). The decode unit 924 can decode the metadata 902 associated with an instruction and set a value in the preemption status register 926 based on the preemption hint. In one embodiment the decode logic can simply store the metadata 902 within the preemption status register 926. In such embodiment the compute unit 920 includes logic to determine a response to a preemption request based on the value stored in the preemption status register 926. The response can be determined based on the preemption hint as well as other factors, including power and performance metrics for the compute unit 920 and/or the GPGPU as a whole.

In one embodiment, the scheduler 910 can preempt a work group on the compute unit 920 by sending a preemption request to the compute unit 920. In one embodiment the scheduler 910 can interrupt the compute unit 920 and indicate a work group executing on the compute unit 920 that is to be preempted. The compute unit 920, in handling the interrupt, can halt execution immediately or continue executing additional instructions to reduce the amount of register data, or other thread state, that is saved to preempt the work group.

While the metadata 902 is illustrated as distinct from the instruction 904, in one embodiment the metadata 902 is a field within the instruction that is parsed by the decode unit 924 while decoding the instruction. In one embodiment, not all instructions have associated metadata 902. Instead the compiler can insert the metadata 902 into the compiled code at periodic intervals or where significant changes to the size of thread context information occurs. In one embodiment the metadata 902 is conveyed via a separate instruction that explicitly sets a value of the preemption status register 926.

The amount of data that can be encoded by a preemption hint within the metadata can be determined based on the number of bits allocated to the hint. In one embodiment a single bit may be encoded that indicates whether preemption is optimal for a given instruction. In one embodiment multiple bits may be encoded to give a variety of data. For example, a 2-bit hint can provide information as indicated in Table 1 below.

TABLE 1

Exemplary Preemption Hint

| Hint (bits) | Meaning |
| --- | --- |
| 00b | Optimal Preemption Point - Register File Usage Low |
| 01b | Register File Usage to Increase Rapidly |
| 10b | Register File Usage High but Will Decrease Rapidly |
| 11b | Register File Usage High with No Immediate Decrease |

As shown in Table 1, a 2-bit hint can encode four values that can indicate one of four possible preemption hints associated with an instruction. The exemplary hints are determined based on the current per-thread register usage. For example, the hint can indicate that a given instruction represents an optimal preemption point (e.g., 00b), as register file usage is currently low. The compute unit 920 would immediately halt execution and preempt if a preemption request were received while executing this instruction. The hint can also indicate that register file usage is to increase rapidly over the next set of instructions (e.g., 01b). Such hint would also cause the compute unit 920 to halt execution to prevent an increase in register file usage. The hint can also indicate that register file usage is high but will decrease rapidly over the next few instructions (e.g., 10b). In response to a preemption request received while executing an instruction having such hint, the compute unit 920 would continue executing instructions until an optimal preemption point is reached. The hint an also indicate that register file usage is high with no immediate decrease. In such scenario the compute unit 920 can response differently depending on the desired preemption latency. If low latency preemption is desired the compute unit 920 can halt execution without regard to the relatively larger amount of context that is required to be saved to perform preemption. However, if context storage space is at a premium, for example, for GPGPUs capable of executing an extremely large number of concurrent threads, the compute unit 920 may continue executing instructions until register file usage decreases. In such scenario, a timeout value can be enforced that limits the number of instructions that may be executed after a preemption request has been received.

Figure 10:
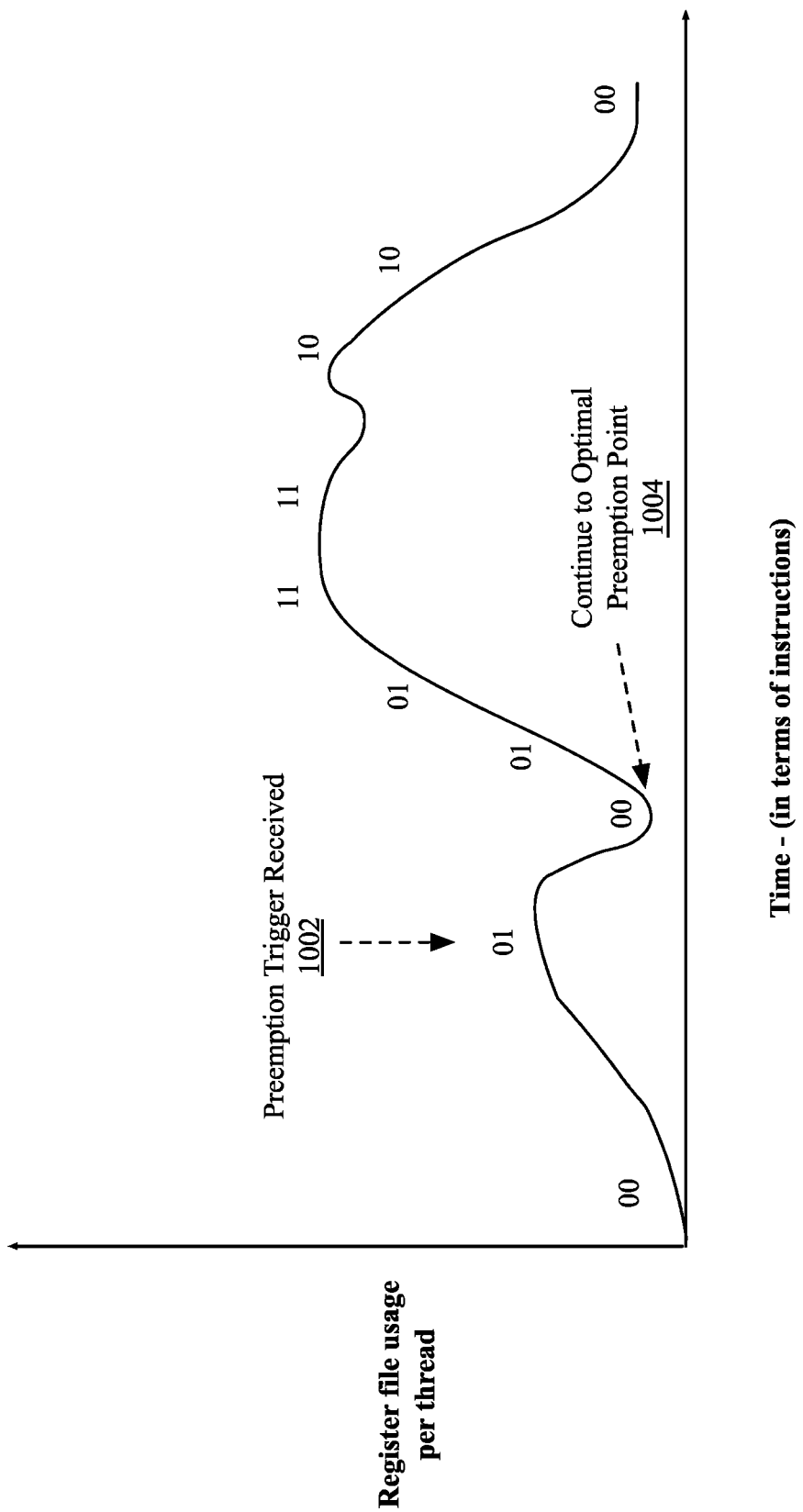
FIG. 10 illustrates an exemplary graph of hints and associated register file usage per thread.

FIG. 10 illustrates an exemplary graph of hints and associated register file usage per thread. The illustrated graph shows a relationship between register file usage, as determined by a source code compiler, and the associated hints associated with the compiled instructions. The exemplary hint values correspond to the hint values of Table 1, although not all embodiments are limited to those specific hint values. In the illustrated graph, the compiler inserts preemption hints at relative points along the execution path to indicate whether changes are upcoming for the the per-thread register file usage. The behavior of a compute unit can vary based on desired preemption latency and tolerance for large context states during preemption. In one embodiments if a preemption trigger is received (1002) while the preemption hint value indicates that register file usage will decrease rapidly, a compute unit can continue to execute until an optimal preemption point is reached (1004). At other points the compute unit can be configured to halt execution immediately as reduction in register file usage (and associated context state) is imminent. Alternatively, if register file usage is high and context storage space is low, the compute unit can continue to execute until an optimal preemption point or a preemption timeout is reached.

Figure 11:
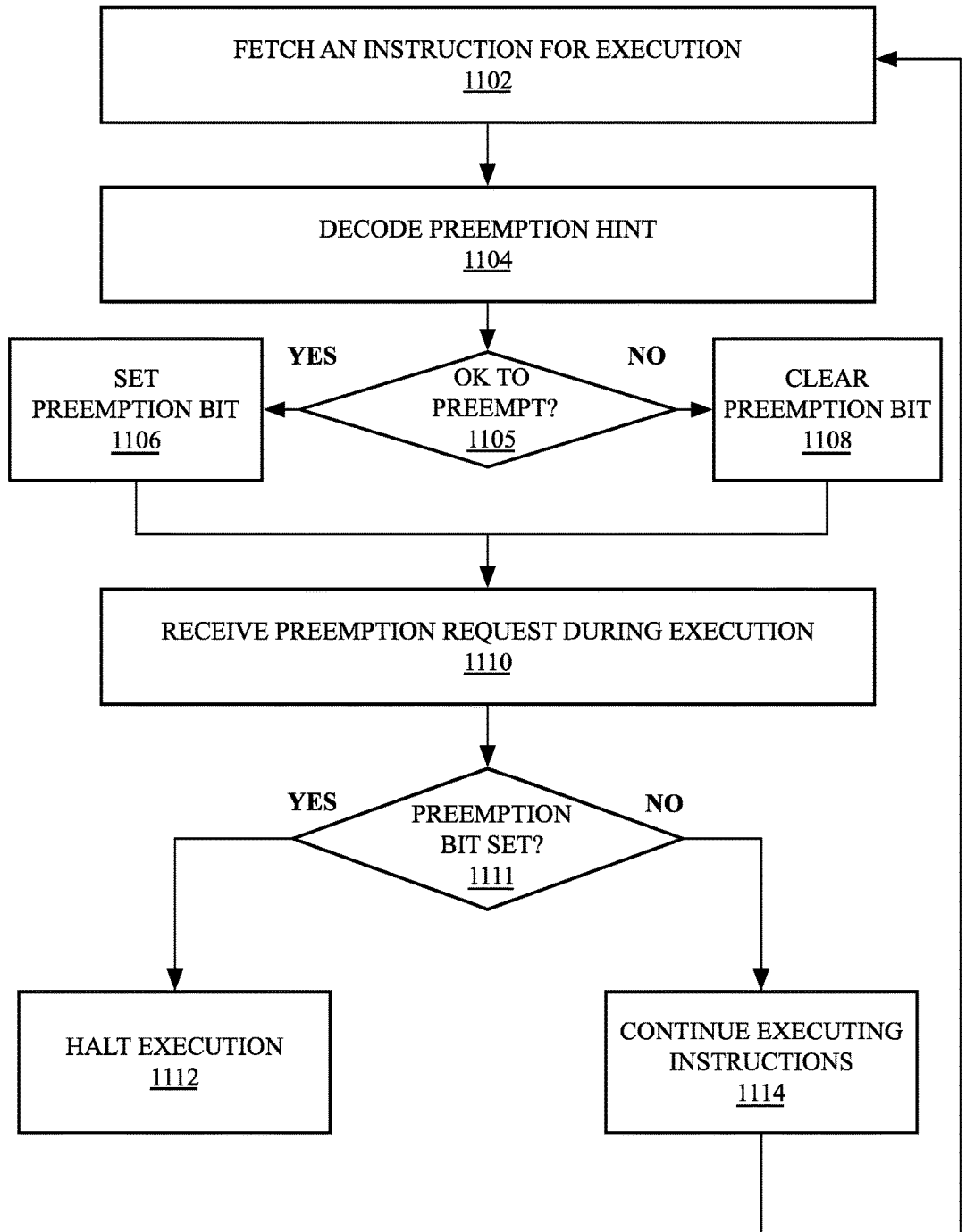
FIG. 11 is a flow diagram of preemption within a compute unit, according to an embodiment.

FIG. 11 is a flow diagram of preemption within a compute unit, according to an embodiment. The preemption can be performed by hardware within compute unit, such as the compute unit 920 of FIG. 9. In one embodiment a fetch unit within the compute unit can fetch an instruction for execution, as shown at 1102. Decode logic can then decode a preemption hint associated with the instruction, as shown art 1104. The preemption hint can be derived from metadata associated with the instruction. The metadata can be an additional set of bits or an additional field appending to the instruction or can be set via a separate instruction. Preemption logic within the compute unit can determine at 1105 if an 'OK to preempt' value can be set for the compute unit. The OK to preempt value can be set within a preemption status register, such as the preemption status register 926 of FIG. 9. The preemption status register 926 can be a register within the register file of the compute unit or can be specially reserved set of bits in internal memory of the compute unit 920. The OK to preempt value can alternatively be set in a set of state flags within the compute unit 920.

In one embodiment if the current hint value indicates that the size of the per-thread state is to decrease over the next set of instruction, preemption logic within the compute unit can clear the preemption bit at 1108. In such embodiment, the preemption logic can set the preemption bit at 1106 based on any other hint value. Additionally, the preemption bit may be set by default and cleared only if continuing to execute additional instructions will result in a nearly immediate decrease in the size of the pre-thread state to be saved before preemption. Alternatively, if thread state storage for suspended threads is low on available capacity the compute unit can continue to execute instructions if the hint indicates that the size of the thread state to be saved is high, even if a reduction is not imminent. Execution can continue until an optimal preemption point is reached or a timeout occurs.

The instruction can begin execution at block 1109. During execution, a preemption request can be received at block 1109. The response to a preemption request received during execution at 1110, in one embodiment, is dependent upon the value of the preemption bit, as determined at 1111. The manner in which the preemption request is received at 1110 can vary according to embodiments. In one embodiment it may be assumed that once a preemption request is received, the request remains active until the compute unit completes execution. If the preemption bit is set, the compute unit can halt execution immediately at 1112. If the compute bit is cleared, the compute unit can continue executing instructions, as shown at 1114 until the preemption bit is cleared based on an updated hint.

Embodiments can be configured based on variations on the operations illustrated in FIG. 11. For example, one embodiment does not include additional logic to set or clear a preemption bit. Instead, a hint value associated with each instruction can be temporarily stored while the instruction is executing. If a preemption request is received the compute unit can determine whether to continue execution based directly on the hint bits received with the instruction.

Figure 12:
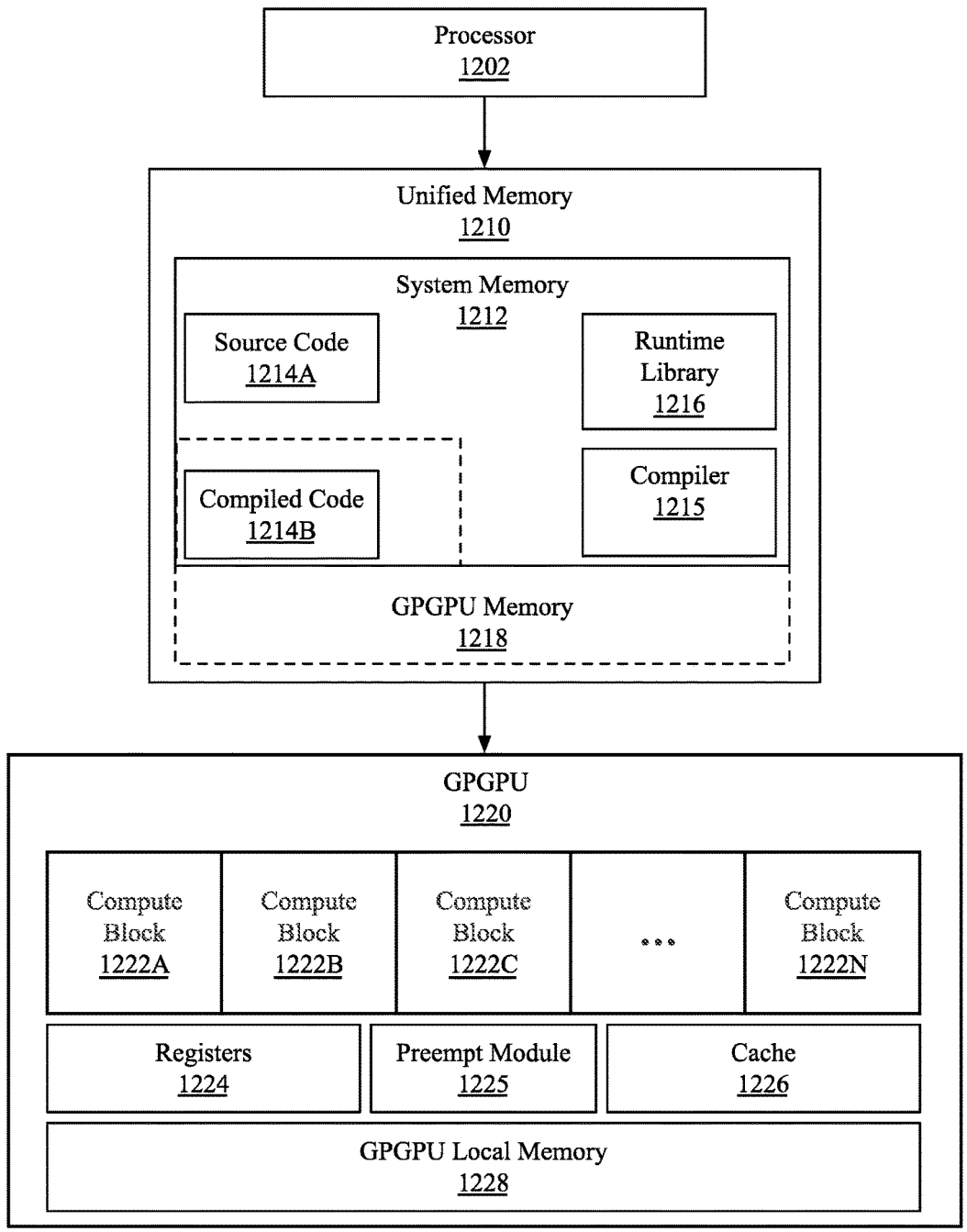
FIG. 12 is a block diagram of a data processing system, according to an embodiment.

FIG. 12 is a block diagram of a data processing system 1200, according to an embodiment. The data processing system 1200 is a heterogeneous processing system having a processor 1202, unified memory 1210, and a GPGPU 1220. The processor 1202 and the GPGPU 1220 can be any of the processors and GPGPU/parallel processors as described herein. The processor 1202 can execute instructions for a compiler 1215 stored in system memory 1212. The compiled 1215 executes on the processor 1202 to compile source code 1214A into compiled code 1214B. The compiled code 1214B can include code that may be executed by the processor 1202 and/or code that may be executed by the GPGPU 1220. During compilation, the compiler 1215 can perform operations to insert metadata, including hints as to register file usage and/or other information related to the size of the per-thread context information that would be saved and restored in the event of preemption. The compiler 1215 can include the information necessary to perform such operations or the operations can be performed with the assistance of a runtime library 1216. The runtime library 1216 can also facilitate the compiler 1215 in the compilation of the source code 1214A and can also include instructions that are linked at runtime with the compiled code 1214B to facilitate execution on the GPGPU 1220.

The unified memory 1210 represents a unified address space that may be accessed by the processor 1202 and the GPGPU 1220. The unified memory includes system memory 1212 as well as GPGPU memory 1218. The GPGPU memory 1218 includes GPGPU local memory 1228 within the GPGPU 1220 and can also include some or all of system memory 1212. For example, compiled code 1214B stored in system memory 1212 can also be mapped into GPGPU memory 1218 for access by the GPGPU 1220.

The GPGPU 1220 includes multiple compute blocks 1222A-1222N, which can be instances of the compute blocks 1220A-1220N of FIG. 12 and FIG. 7. The GPGPU 1220 also includes a set of registers 1224, cache memory 1226, and a preempt module 1225 that can be shared among the compute blocks 1222A-1222N. The preempt module 1225 can be configured to manage compute block preemption as illustrated in FIG. 8 as well as selective preemption based on commands or instruction type as illustrated in FIG. 11. The GPGPU 1220 can additionally include GPGPU local memory 1228, which is physical memory that shares a graphics card or multi-chip module with the GPGPU 1220.

Additional Exemplary Graphics Processing System

Details of the embodiments described above can be incorporated within graphics processing systems and devices described below. The graphics processing system and devices of FIG. 13 through FIG. 26 illustrate alternative systems and graphics processing hardware that can implement any and all of the techniques described above.

Additional Exemplary Graphics Processing System Overview

Figure 13:
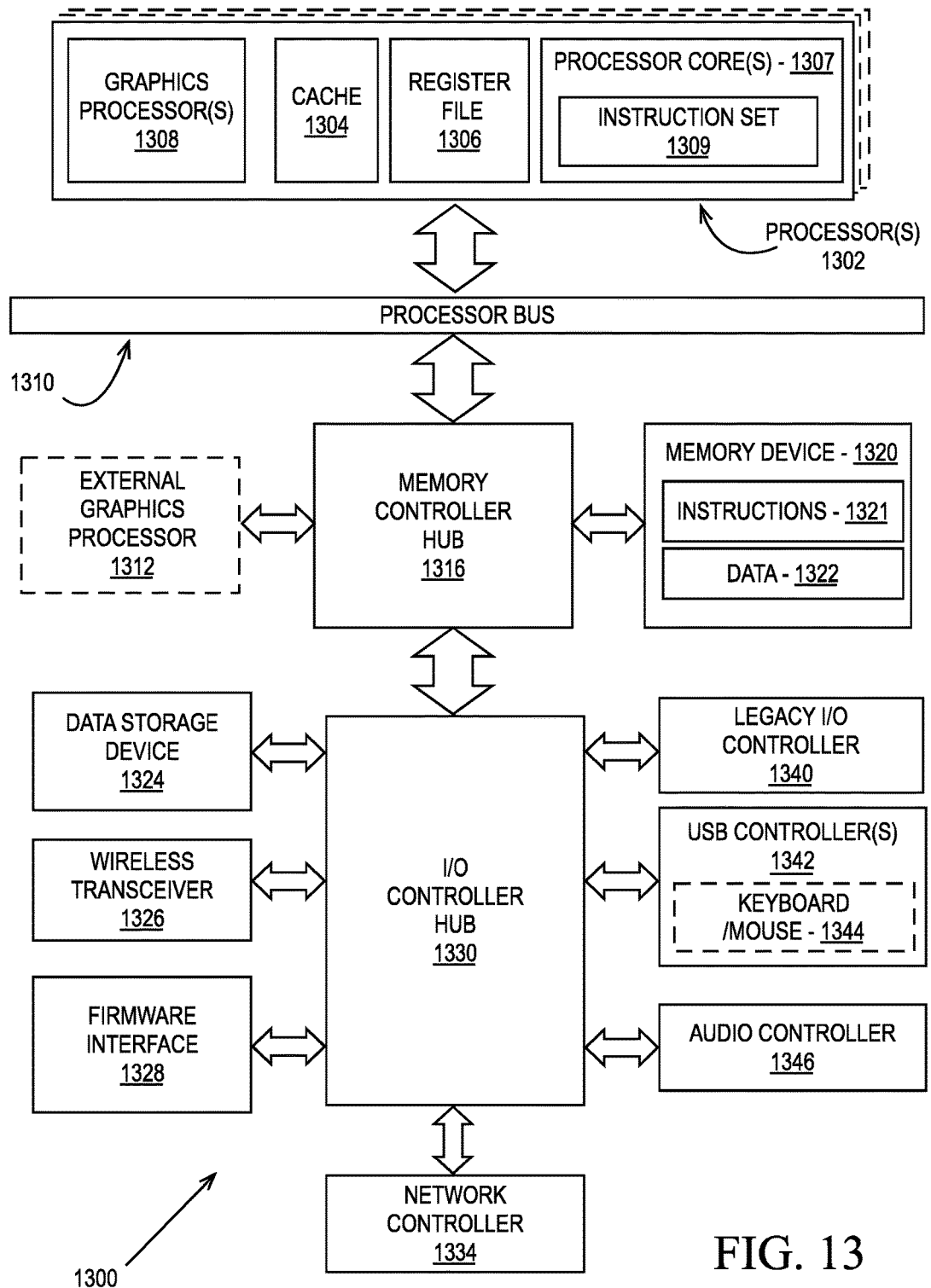
FIG. 13 is a block diagram of a processing system, according to an embodiment.

FIG. 13 is a block diagram of a processing system 1300, according to an embodiment. In various embodiments the system 1300 includes one or more processors 1302 and one or more graphics processors 1308, and may be a single processor desktop system, a multiprocessor workstation system, or a server system having a large number of processors 1302 or processor cores 1307. In one embodiment, the system 1300 is a processing platform incorporated within a system-on-a-chip (SoC) integrated circuit for use in mobile, handheld, or embedded devices.

An embodiment of system 1300 can include, or be incorporated within a server-based gaming platform, a game console, including a game and media console, a mobile gaming console, a handheld game console, or an online game console. In some embodiments system 1300 is a mobile phone, smart phone, tablet computing device or mobile Internet device. Data processing system 1300 can also include, couple with, or be integrated within a wearable device, such as a smart watch wearable device, smart eyewear device, augmented reality device, or virtual reality device. In some embodiments, data processing system 1300 is a television or set top box device having one or more processors 1302 and a graphical interface generated by one or more graphics processors 1308.

In some embodiments, the one or more processors 1302 each include one or more processor cores 1307 to process instructions which, when executed, perform operations for system and user software. In some embodiments, each of the one or more processor cores 1307 is configured to process a specific instruction set 1309. In some embodiments, instruction set 1309 may facilitate Complex Instruction Set Computing (CISC), Reduced Instruction Set Computing (RISC), or computing via a Very Long Instruction Word (VLIW). Multiple processor cores 1307 may each process a different instruction set 1309, which may include instructions to facilitate the emulation of other instruction sets. Processor core 1307 may also include other processing devices, such a Digital Signal Processor (DSP).

In some embodiments, the processor 1302 includes cache memory 1304. Depending on the architecture, the processor 1302 can have a single internal cache or multiple levels of internal cache. In some embodiments, the cache memory is shared among various components of the processor 1302. In some embodiments, the processor 1302 also uses an external cache (e.g., a Level-3 (L3) cache or Last Level Cache (LLC)) (not shown), which may be shared among processor cores 1307 using known cache coherency techniques. A register file 1306 is additionally included in processor 1302 which may include different types of registers for storing different types of data (e.g., integer registers, floating point registers, status registers, and an instruction pointer register). Some registers may be general-purpose registers, while other registers may be specific to the design of the processor 1302.

In some embodiments, processor 1302 is coupled with a processor bus 1310 to transmit communication signals such as address, data, or control signals between processor 1302 and other components in system 1300. In one embodiment the system 1300 uses an exemplary 'hub' system architecture, including a memory controller hub 1316 and an Input Output (I/O) controller hub 1330. A memory controller hub 1316 facilitates communication between a memory device and other components of system 1300, while an I/O Controller Hub (ICH) 1330 provides connections to I/O devices via a local I/O bus. In one embodiment, the logic of the memory controller hub 1316 is integrated within the processor.

Memory device 1320 can be a dynamic random access memory (DRAM) device, a static random access memory (SRAM) device, flash memory device, phase-change memory device, or some other memory device having suitable performance to serve as process memory. In one embodiment the memory device 1320 can operate as system memory for the system 1300, to store data 1322 and instructions 1321 for use when the one or more processors 1302 executes an application or process. Memory controller hub 1316 also couples with an optional external graphics processor 1312, which may communicate with the one or more graphics processors 1308 in processors 1302 to perform graphics and media operations.

In some embodiments, ICH 1330 enables peripherals to connect to memory device 1320 and processor 1302 via a high-speed I/O bus. The I/O peripherals include, but are not limited to, an audio controller 1346, a firmware interface 1328, a wireless transceiver 1326 (e.g., Wi-Fi, Bluetooth), a data storage device 1324 (e.g., hard disk drive, flash memory, etc.), and a legacy I/O controller 1340 for coupling legacy (e.g., Personal System 2 (PS/2)) devices to the system. One or more Universal Serial Bus (USB) controllers 1342 connect input devices, such as keyboard and mouse 1344 combinations. A network controller 1334 may also couple with ICH 1330. In some embodiments, a high-performance network controller (not shown) couples with processor bus 1310. It will be appreciated that the system 1300 shown is exemplary and not limiting, as other types of data processing systems that are differently configured may also be used. For example, the I/O controller hub 1330 may be integrated within the one or more processor 1302, or the memory controller hub 1316 and I/O controller hub 1330 may be integrated into a discreet external graphics processor, such as the external graphics processor 1312.

Figure 14:
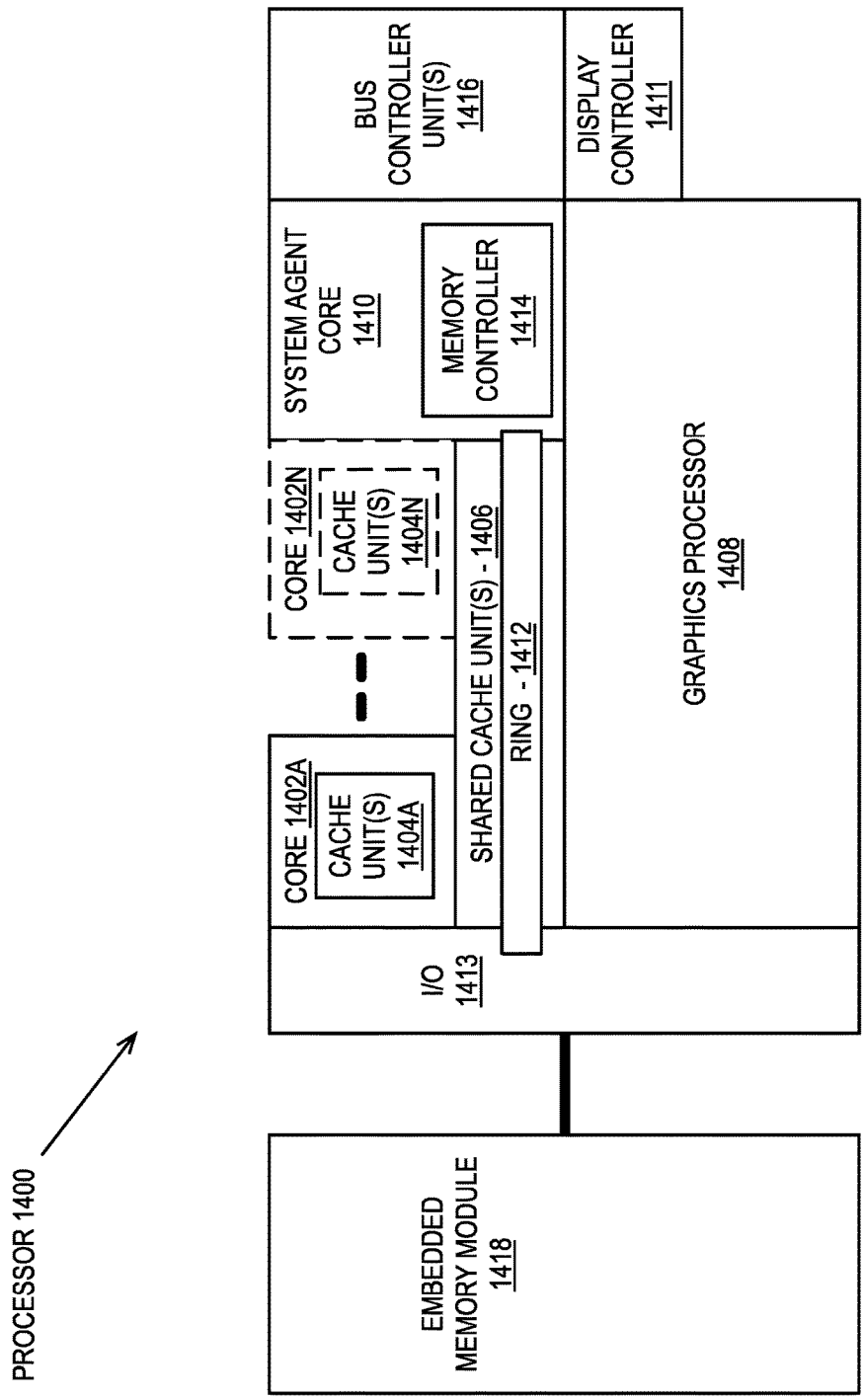
FIG. 14 is a block diagram of a processor according to an embodiment.

FIG. 14 is a block diagram of an embodiment of a processor 1400 having one or more processor cores 1402A-1402N, an integrated memory controller 1414, and an integrated graphics processor 1408. Those elements of FIG. 14 having the same reference numbers (or names) as the elements of any other figure herein can operate or function in any manner similar to that described elsewhere herein, but are not limited to such. Processor 1400 can include additional cores up to and including additional core 1402N represented by the dashed lined boxes. Each of processor cores 1402A-1402N includes one or more internal cache units 1404A-1404N. In some embodiments each processor core also has access to one or more shared cached units 1406.

The internal cache units 1404A-1404N and shared cache units 1406 represent a cache memory hierarchy within the processor 1400. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1406 and 1404A-1404N.

In some embodiments, processor 1400 may also include a set of one or more bus controller units 1416 and a system agent core 1410. The one or more bus controller units 1416 manage a set of peripheral buses, such as one or more Peripheral Component Interconnect buses (e.g., PCI, PCI Express). System agent core 1410 provides management functionality for the various processor components. In some embodiments, system agent core 1410 includes one or more integrated memory controllers 1414 to manage access to various external memory devices (not shown).

In some embodiments, one or more of the processor cores 1402A-1402N include support for simultaneous multi-threading. In such embodiment, the system agent core 1410 includes components for coordinating and operating cores 1402A-1402N during multi-threaded processing. System agent core 1410 may additionally include a power control unit (PCU), which includes logic and components to regulate the power state of processor cores 1402A-1402N and graphics processor 1408.

In some embodiments, processor 1400 additionally includes graphics processor 1408 to execute graphics processing operations. In some embodiments, the graphics processor 1408 couples with the set of shared cache units 1406, and the system agent core 1410, including the one or more integrated memory controllers 1414. In some embodiments, a display controller 1411 is coupled with the graphics processor 1408 to drive graphics processor output to one or more coupled displays. In some embodiments, display controller 1411 may be a separate module coupled with the graphics processor via at least one interconnect, or may be integrated within the graphics processor 1408 or system agent core 1410.

In some embodiments, a ring based interconnect unit 1412 is used to couple the internal components of the processor 1400. However, an alternative interconnect unit may be used, such as a point-to-point interconnect, a switched interconnect, or other techniques, including techniques well known in the art. In some embodiments, graphics processor 1408 couples with the ring interconnect 1412 via an I/O link 1413.

The exemplary I/O link 1413 represents at least one of multiple varieties of I/O interconnects, including an on package I/O interconnect which facilitates communication between various processor components and a high-performance embedded memory module 1418, such as an eDRAM module. In some embodiments, each of the processor cores 1402A-1402N and graphics processor 1408 use embedded memory modules 1418 as a shared Last Level Cache.

In some embodiments, processor cores 1402A-1402N are homogenous cores executing the same instruction set architecture. In another embodiment, processor cores 1402A-1402N are heterogeneous in terms of instruction set architecture (ISA), where one or more of processor cores 1402A-1402N execute a first instruction set, while at least one of the other cores executes a subset of the first instruction set or a different instruction set. In one embodiment processor cores 1402A-1402N are heterogeneous in terms of microarchitecture, where one or more cores having a relatively higher power consumption couple with one or more power cores having a lower power consumption. Additionally, processor 1400 can be implemented on one or more chips or as an SoC integrated circuit having the illustrated components, in addition to other components.

Figure 15:
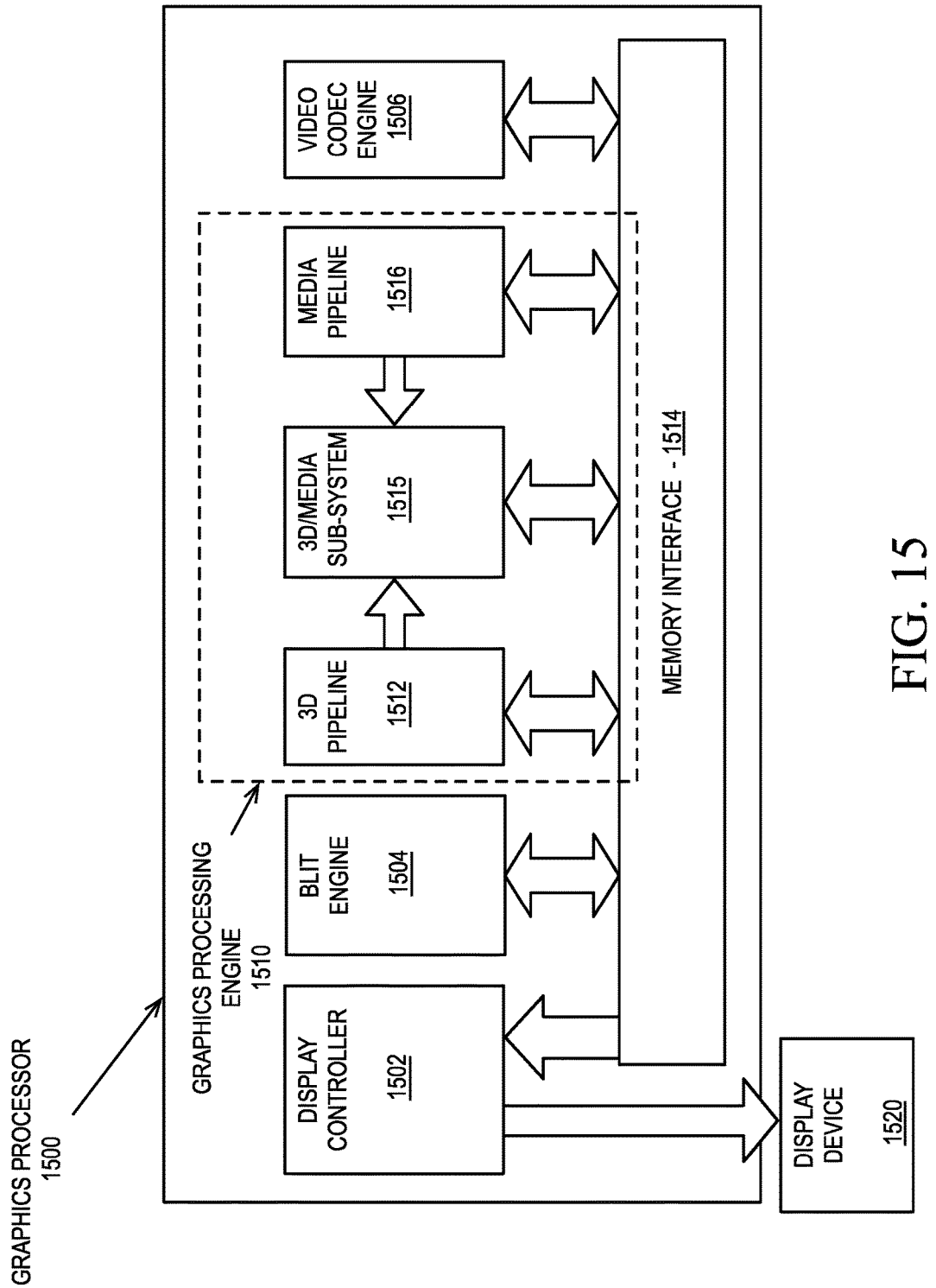
FIG. 15 is a block diagram of a graphics processor, according to an embodiment.

FIG. 15 is a block diagram of a graphics processor 1500, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1500 includes a memory interface 1514 to access memory. Memory interface 1514 can be an interface to local memory, one or more internal caches, one or more shared external caches, and/or to system memory.

In some embodiments, graphics processor 1500 also includes a display controller 1502 to drive display output data to a display device 1520. Display controller 1502 includes hardware for one or more overlay planes for the display and composition of multiple layers of video or user interface elements. In some embodiments, graphics processor 1500 includes a video codec engine 1506 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1500 includes a block image transfer (BLIT) engine 1504 to perform two-dimensional (2D) rasterizer operations including, for example, bit-boundary block transfers. However, in one embodiment, 2D graphics operations are performed using one or more components of graphics processing engine (GPE) 1510. In some embodiments, GPE 1510 is a compute engine for performing graphics operations, including three-dimensional (3D) graphics operations and media operations.

In some embodiments, GPE 310 includes a 3D pipeline 1512 for performing 3D operations, such as rendering three-dimensional images and scenes using processing functions that act upon 3D primitive shapes (e.g., rectangle, triangle, etc.). The 3D pipeline 1512 includes programmable and fixed function elements that perform various tasks within the element and/or spawn execution threads to a 3D/Media sub-system 1515. While 3D pipeline 1512 can be used to perform media operations, an embodiment of GPE 1510 also includes a media pipeline 1516 that is specifically used to perform media operations, such as video post-processing and image enhancement.

In some embodiments, media pipeline 1516 includes fixed function or programmable logic units to perform one or more specialized media operations, such as video decode acceleration, video de-interlacing, and video encode acceleration in place of, or on behalf of video codec engine 1506. In some embodiments, media pipeline 1516 additionally includes a thread spawning unit to spawn threads for execution on 3D/Media sub-system 1515. The spawned threads perform computations for the media operations on one or more graphics execution units included in 3D/Media sub-system 1515.

In some embodiments, 3D/Media subsystem 1515 includes logic for executing threads spawned by 3D pipeline 1512 and media pipeline 1516. In one embodiment, the pipelines send thread execution requests to 3D/Media sub-system 1515, which includes thread dispatch logic for arbitrating and dispatching the various requests to available thread execution resources. The execution resources include an array of graphics execution units to process the 3D and media threads. In some embodiments, 3D/Media subsystem 1515 includes one or more internal caches for thread instructions and data. In some embodiments, the subsystem also includes shared memory, including registers and addressable memory, to share data between threads and to store output data.

Exemplary Additional Graphics Processing Engine

Figure 16:
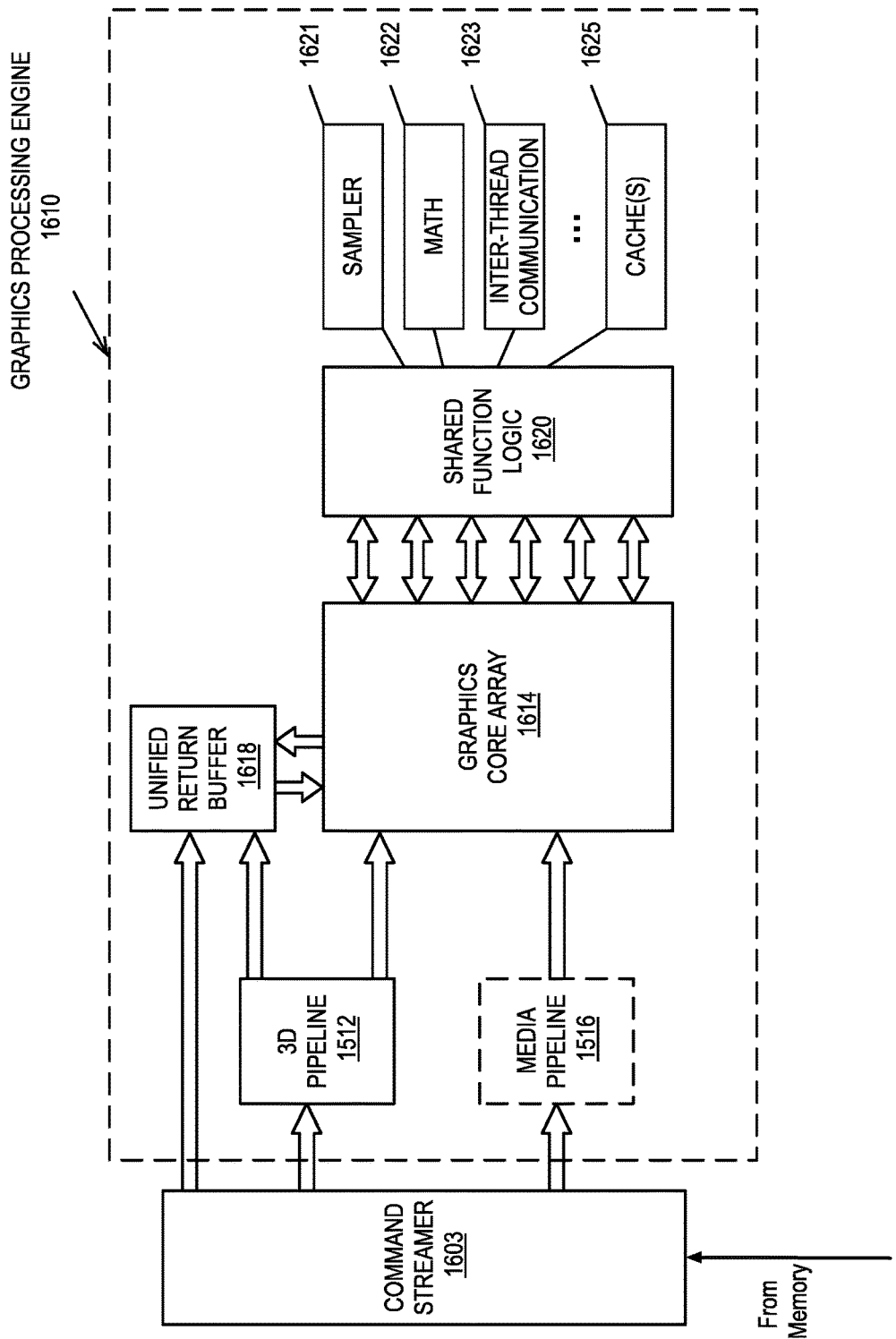
FIG. 16 is a block diagram of a graphics processing engine of a graphics processor in accordance with some embodiments.

FIG. 16 is a block diagram of a graphics processing engine 1610 of a graphics processor in accordance with some embodiments. In one embodiment, the graphics processing engine (GPE) 1610 is a version of the GPE 1510 shown in FIG. 15. Elements of FIG. 16 having the same reference numbers (or names) as the elements of any other figure herein can operate or function in any manner similar to that described elsewhere herein, but are not limited to such. For example, the 3D pipeline 1512 and media pipeline 1516 of FIG. 15 are illustrated. The media pipeline 1516 is optional in some embodiments of the GPE 1610 and may not be explicitly included within the GPE 1610. For example and in at least one embodiment, a separate media and/or image processor is coupled to the GPE 1610.

In some embodiments, GPE 1610 couples with or includes a command streamer 1603, which provides a command stream to the 3D pipeline 1512 and/or media pipelines 1516. In some embodiments, command streamer 1603 is coupled with memory, which can be system memory, or one or more of internal cache memory and shared cache memory. In some embodiments, command streamer 1603 receives commands from the memory and sends the commands to 3D pipeline 1512 and/or media pipeline 1516. The commands are directives fetched from a ring buffer, which stores commands for the 3D pipeline 1512 and media pipeline 1516. In one embodiment, the ring buffer can additionally include batch command buffers storing batches of multiple commands. The commands for the 3D pipeline 1512 can also include references to data stored in memory, such as but not limited to vertex and geometry data for the 3D pipeline 1512 and/or image data and memory objects for the media pipeline 1516. The 3D pipeline 1512 and media pipeline 1516 process the commands and data by performing operations via logic within the respective pipelines or by dispatching one or more execution threads to a graphics core array 1614.

In various embodiments the 3D pipeline 1512 can execute one or more shader programs, such as vertex shaders, geometry shaders, pixel shaders, fragment shaders, compute shaders, or other shader programs, by processing the instructions and dispatching execution threads to the graphics core array 1614. The graphics core array 1614 provides a unified block of execution resources. Multi-purpose execution logic (e.g., execution units) within the graphic core array 1614 includes support for various 3D API shader languages and can execute multiple simultaneous execution threads associated with multiple shaders.

In some embodiments the graphics core array 1614 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 1402A-1402N as in FIG. 14.

Output data generated by threads executing on the graphics core array 1614 can output data to memory in a unified return buffer (URB) 1618. The URB 1618 can store data for multiple threads. In some embodiments the URB 1618 may be used to send data between different threads executing on the graphics core array 1614. In some embodiments the URB 1618 may additionally be used for synchronization between threads on the graphics core array and fixed function logic within the shared function logic 1620.

In some embodiments, graphics core array 1614 is scalable, such that the array includes a variable number of graphics cores, each having a variable number of execution units based on the target power and performance level of GPE 1610. In one embodiment the execution resources are dynamically scalable, such that execution resources may be enabled or disabled as needed.

The graphics core array 1614 couples with shared function logic 1620 that includes multiple resources that are shared between the graphics cores in the graphics core array. The shared functions within the shared function logic 1620 are hardware logic units that provide specialized supplemental functionality to the graphics core array 1614. In various embodiments, shared function logic 1620 includes but is not limited to sampler 1621, math 1622, and inter-thread communication (ITC) 1623 logic. Additionally, some embodiments implement one or more cache(s) 1625 within the shared function logic 1620. A shared function is implemented where the demand for a given specialized function is insufficient for inclusion within the graphics core array 1614. Instead a single instantiation of that specialized function is implemented as a stand-alone entity in the shared function logic 1620 and shared among the execution resources within the graphics core array 1614. The precise set of functions that are shared between the graphics core array 1614 and included within the graphics core array 1614 varies between embodiments.

Figure 17:
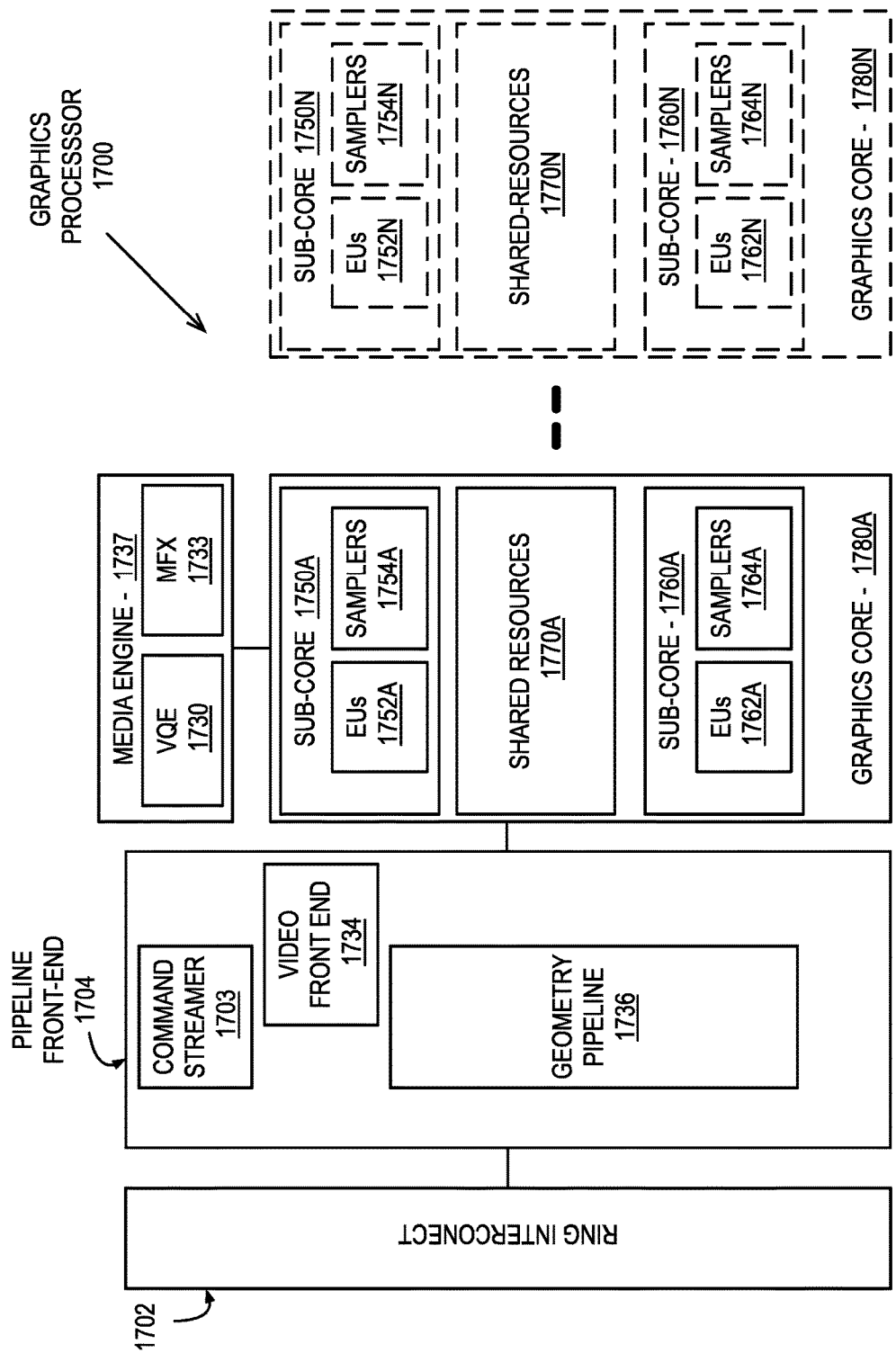
FIG. 17 is a block diagram of a graphics processor provided by an additional embodiment.

FIG. 17 is a block diagram of another embodiment of a graphics processor 1700. Elements of FIG. 17 having the same reference numbers (or names) as the elements of any other figure herein can operate or function in any manner similar to that described elsewhere herein, but are not limited to such.

In some embodiments, graphics processor 1700 includes a ring interconnect 1702, a pipeline front-end 1704, a media engine 1737, and graphics cores 1780A-1780N. In some embodiments, ring interconnect 1702 couples the graphics processor to other processing units, including other graphics processors or one or more general-purpose processor cores. In some embodiments, the graphics processor is one of many processors integrated within a multi-core processing system.

In some embodiments, graphics processor 1700 receives batches of commands via ring interconnect 1702. The incoming commands are interpreted by a command streamer 1703 in the pipeline front-end 1704. In some embodiments, graphics processor 1700 includes scalable execution logic to perform 3D geometry processing and media processing via the graphics core(s) 1780A-1780N. For 3D geometry processing commands, command streamer 1703 supplies commands to geometry pipeline 1736. For at least some media processing commands, command streamer 1703 supplies the commands to a video front-end 1734, which couples with a media engine 1737. In some embodiments, media engine 1737 includes a Video Quality Engine (VQE) 1730 for video and image post-processing and a multi-format encode/decode (MFX) 1733 engine to provide hardware-accelerated media data encode and decode. In some embodiments, geometry pipeline 1736 and media engine 1737 each generate execution threads for the thread execution resources provided by at least one graphics core 1780A.

In some embodiments, graphics processor 1700 includes scalable thread execution resources featuring modular cores 1780A-1780N (sometimes referred to as core slices), each having multiple sub-cores 1750A-550N, 1760A-1760N (sometimes referred to as core sub-slices). In some embodiments, graphics processor 1700 can have any number of graphics cores 1780A through 1780N. In some embodiments, graphics processor 1700 includes a graphics core 1780A having at least a first sub-core 1750A and a second sub-core 1760A. In other embodiments, the graphics processor is a low power processor with a single sub-core (e.g., 1750A). In some embodiments, graphics processor 1700 includes multiple graphics cores 1780A-1780N, each including a set of first sub-cores 1750A-1750N and a set of second sub-cores 1760A-1760N. Each sub-core in the set of first sub-cores 1750A-1750N includes at least a first set of execution units 1752A-1752N and media/texture samplers 1754A-1754N. Each sub-core in the set of second sub-cores 1760A-1760N includes at least a second set of execution units 1762A-1762N and samplers 1764A-1764N. In some embodiments, each sub-core 1750A-1750N, 1760A-1760N shares a set of shared resources 1770A-1770N. In some embodiments, the shared resources include shared cache memory and pixel operation logic. Other shared resources may also be included in the various embodiments of the graphics processor.

Exemplary Additional Execution Units

Figure 18:
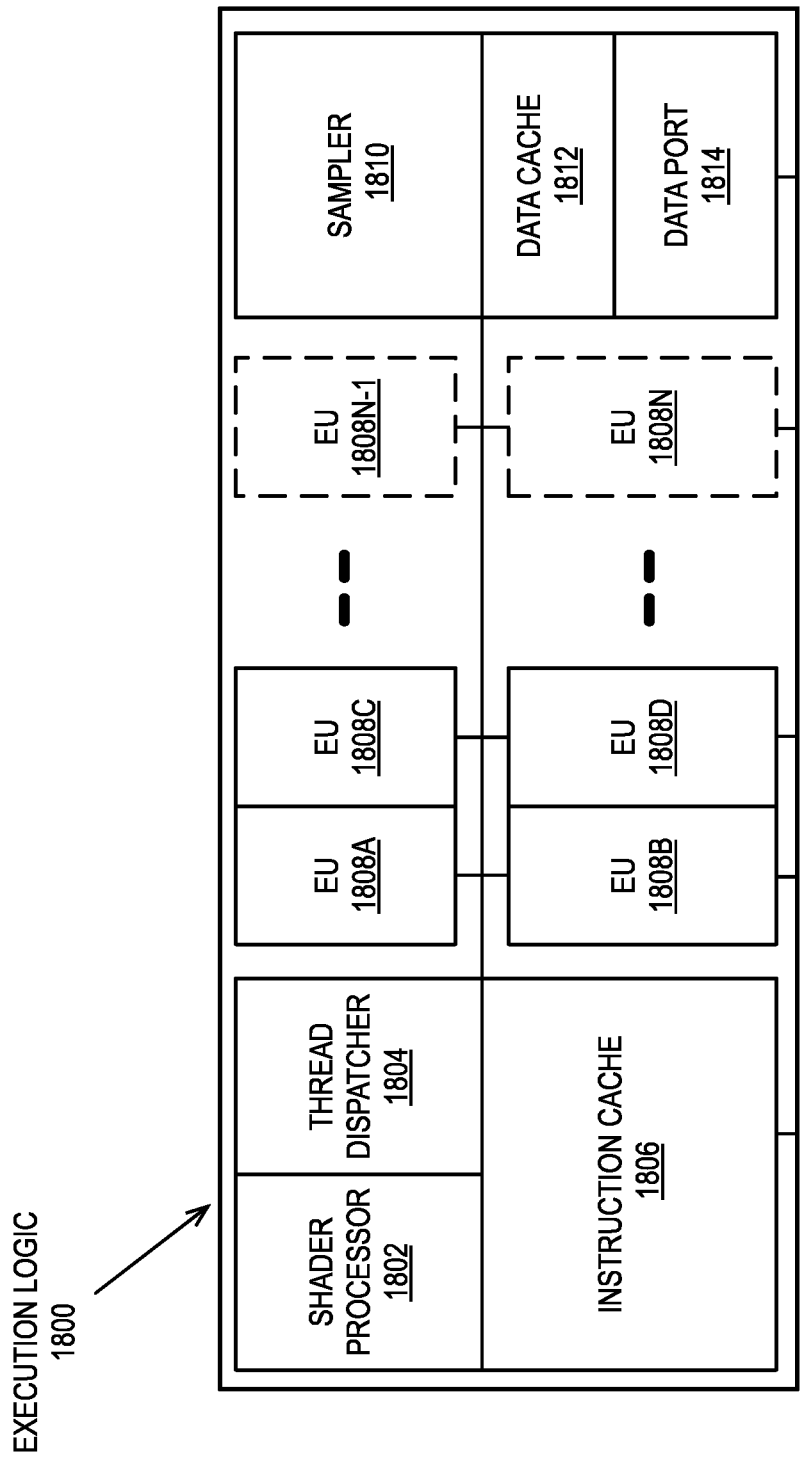
FIG. 18 illustrates thread execution logic including an array of processing elements employed in some embodiments.

FIG. 18 illustrates thread execution logic 1800 including an array of processing elements employed in some embodiments of a GPE. Elements of FIG. 18 having the same reference numbers (or names) as the elements of any other figure herein can operate or function in any manner similar to that described elsewhere herein, but are not limited to such.

In some embodiments, thread execution logic 1800 includes a shader processor 1802, a thread dispatcher 1804, instruction cache 1806, a scalable execution unit array including a plurality of execution units 1808A-1808N, a sampler 1810, a data cache 1812, and a data port 1814. In one embodiment the scalable execution unit array can dynamically scale by enabling or disabling one or more execution units (e.g., any of execution unit 1808A, 1808B, 1808C, 1808D, through 1808N-1 and 1808N) based on the computational requirements of a workload. In one embodiment the included components are interconnected via an interconnect fabric that links to each of the components. In some embodiments, thread execution logic 1800 includes one or more connections to memory, such as system memory or cache memory, through one or more of instruction cache 1806, data port 1814, sampler 1810, and execution units 1808A-1808N. In some embodiments, each execution unit (e.g. 1808A) is a stand-alone programmable general purpose computational unit that is capable of executing multiple simultaneous hardware threads while processing multiple data elements in parallel for each thread. In various embodiments, the array of execution units 1808A-1808N is scalable to include any number individual execution units.

In some embodiments, the execution units 1808A-1808N are primarily used to execute shader programs. A shader processor 1802 can process the various shader programs and dispatch execution threads associated with the shader programs via a thread dispatcher 1804. In one embodiment the thread dispatcher includes logic to arbitrate thread initiation requests from the graphics and media pipelines and instantiate the requested threads on one or more execution unit in the execution units 1808A-1808N. For example, the geometry pipeline (e.g., 1736 of FIG. 17) can dispatch vertex, tessellation, or geometry shaders to the thread execution logic 1800 (FIG. 18) for processing. In some embodiments, thread dispatcher 1804 can also process runtime thread spawning requests from the executing shader programs.

In some embodiments, the execution units 1808A-1808N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1808A-1808N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1808A-1808N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 1808A-1808N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1808A-1808N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1806) are included in the thread execution logic 1800 to cache thread instructions for the execution units. In some embodiments, one or more data caches (e.g., 1812) are included to cache thread data during thread execution. In some embodiments, a sampler 1810 is included to provide texture sampling for 3D operations and media sampling for media operations. In some embodiments, sampler 1810 includes specialized texture or media sampling functionality to process texture or media data during the sampling process before providing the sampled data to an execution unit.

During execution, the graphics and media pipelines send thread initiation requests to thread execution logic 1800 via thread spawning and dispatch logic. Once a group of geometric objects has been processed and rasterized into pixel data, pixel processor logic (e.g., pixel shader logic, fragment shader logic, etc.) within the shader processor 1802 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1802 then executes an application programming interface (API)-supplied pixel or fragment shader program. To execute the shader program, the shader processor 1802 dispatches threads to an execution unit (e.g., 1808A) via thread dispatcher 1804. In some embodiments, pixel shader 1802 uses texture sampling logic in the sampler 1810 to access texture data in texture maps stored in memory. Arithmetic operations on the texture data and the input geometry data compute pixel color data for each geometric fragment, or discards one or more pixels from further processing.

In some embodiments, the data port 1814 provides a memory access mechanism for the thread execution logic 1800 output processed data to memory for processing on a graphics processor output pipeline. In some embodiments, the data port 1814 includes or couples to one or more cache memories (e.g., data cache 1812) to cache data for memory access via the data port.

Figure 19:
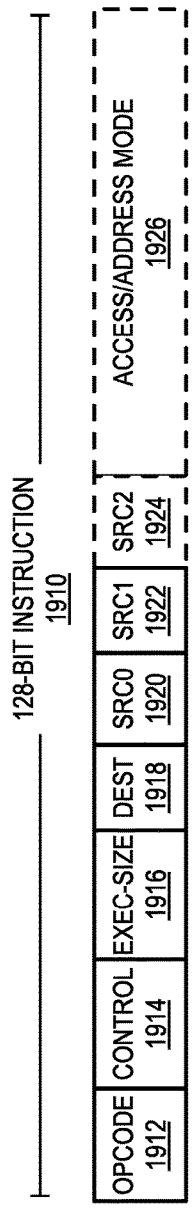
FIG. 19 is a block diagram illustrating a graphics processor instruction formats according to some embodiments.
Figure 19:
Figure 19:
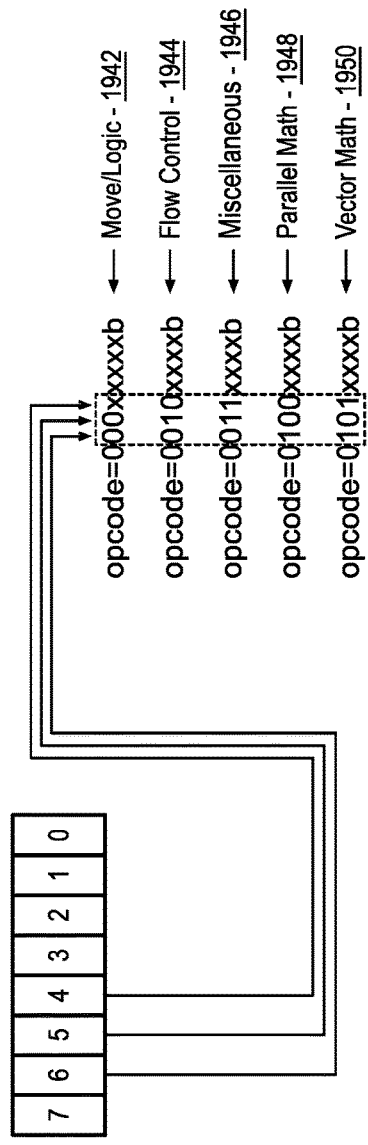

FIG. 19 is a block diagram illustrating a graphics processor instruction formats 1900 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1900 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1910. A 64-bit compacted instruction format 1930 is available for some instructions based on the selected instruction, instruction options, and number of operands. The native 128-bit instruction format 710 provides access to all instruction options, while some options and operations are restricted in the 64-bit format 1930. The native instructions available in the 64-bit format 1930 vary by embodiment. In some embodiments, the instruction is compacted in part using a set of index values in an index field 1913. The execution unit hardware references a set of compaction tables based on the index values and uses the compaction table outputs to reconstruct a native instruction in the 128-bit instruction format 1910.

For each format, instruction opcode 1912 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1914 enables control over certain execution options, such as channels selection (e.g., predication) and data channel order (e.g., swizzle). For instructions in the 128-bit instruction format 1910 an exec-size field 1916 limits the number of data channels that will be executed in parallel. In some embodiments, exec-size field 1916 is not available for use in the 64-bit compact instruction format 1930.

Some execution unit instructions have up to three operands including two source operands, src0 1920, src1 1922, and one destination 1918. In some embodiments, the execution units support dual destination instructions, where one of the destinations is implied. Data manipulation instructions can have a third source operand (e.g., SRC2 1924), where the instruction opcode 1912 determines the number of source operands. An instruction's last source operand can be an immediate (e.g., hard-coded) value passed with the instruction.

In some embodiments, the 128-bit instruction format 1910 includes an access/address mode field 1926 specifying, for example, whether direct register addressing mode or indirect register addressing mode is used. When direct register addressing mode is used, the register address of one or more operands is directly provided by bits in the instruction.

In some embodiments, the 128-bit instruction format 1910 includes an access/address mode field 1926, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1926 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1912 bit-fields to simplify Opcode decode 1940. For an 8-bit opcode, bits 4, 5, and 6 allow the execution unit to determine the type of opcode. The precise opcode grouping shown is merely an example. In some embodiments, a move and logic opcode group 1942 includes data movement and logic instructions (e.g., move (mov), compare (cmp)). In some embodiments, move and logic group 1942 shares the five most significant bits (MSB), where move (mov) instructions are in the form of 0000xxxxb and logic instructions are in the form of 0001xxxxb. A flow control instruction group 1944 (e.g., call, jump (jmp)) includes instructions in the form of 0010xxxxb (e.g., 0x20). A miscellaneous instruction group 1946 includes a mix of instructions, including synchronization instructions (e.g., wait, send) in the form of 0011xxxxb (e.g., 0x30). A parallel math instruction group 1948 includes component-wise arithmetic instructions (e.g., add, multiply (mul)) in the form of 0100xxxxb (e.g., 0x40). The parallel math group 1948 performs the arithmetic operations in parallel across data channels. The vector math group 1950 includes arithmetic instructions (e.g., dp4) in the form of 0101xxxxb (e.g., 0x50). The vector math group performs arithmetic such as dot product calculations on vector operands.

Exemplary Additional Graphics Pipeline

Figure 20:
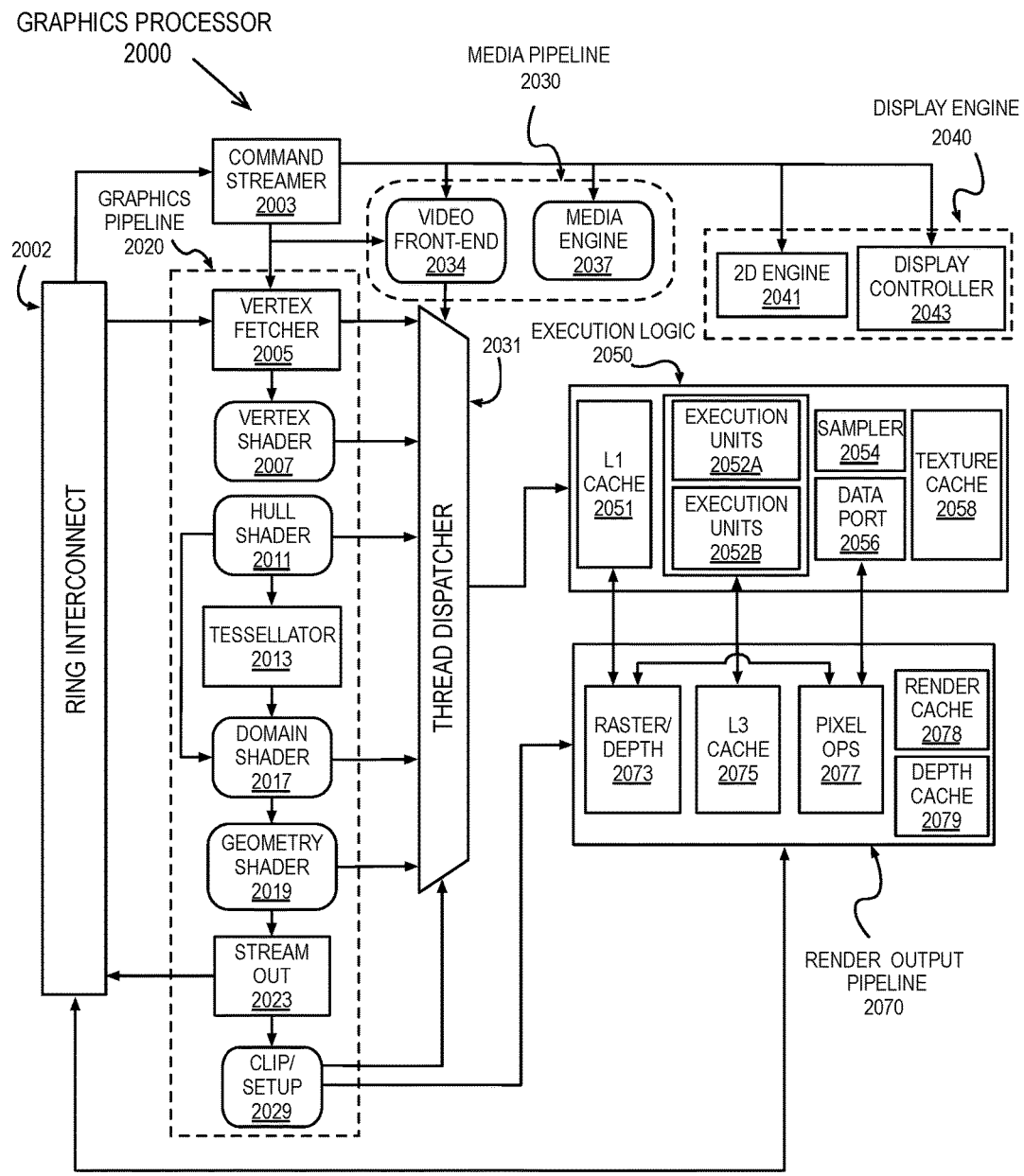
FIG. 20 is a block diagram of a graphics processor according to another embodiment.

FIG. 20 is a block diagram of another embodiment of a graphics processor 2000. Elements of FIG. 20 having the same reference numbers (or names) as the elements of any other figure herein can operate or function in any manner similar to that described elsewhere herein, but are not limited to such.

In some embodiments, graphics processor 2000 includes a graphics pipeline 2020, a media pipeline 2030, a display engine 2040, thread execution logic 2050, and a render output pipeline 2070. In some embodiments, graphics processor 2000 is a graphics processor within a multi-core processing system that includes one or more general purpose processing cores. The graphics processor is controlled by register writes to one or more control registers (not shown) or via commands issued to graphics processor 2000 via a ring interconnect 2002. In some embodiments, ring interconnect 2002 couples graphics processor 2000 to other processing components, such as other graphics processors or general-purpose processors. Commands from ring interconnect 2002 are interpreted by a command streamer 2003, which supplies instructions to individual components of graphics pipeline 2020 or media pipeline 2030.

In some embodiments, command streamer 2003 directs the operation of a vertex fetcher 2005 that reads vertex data from memory and executes vertex-processing commands provided by command streamer 2003. In some embodiments, vertex fetcher 2005 provides vertex data to a vertex shader 2007, which performs coordinate space transformation and lighting operations to each vertex. In some embodiments, vertex fetcher 2005 and vertex shader 2007 execute vertex-processing instructions by dispatching execution threads to execution units 2052A-2052B via a thread dispatcher 2031.

In some embodiments, execution units 2052A-2052B are an array of vector processors having an instruction set for performing graphics and media operations. In some embodiments, execution units 2052A-2052B have an attached L1 cache 2051 that is specific for each array or shared between the arrays. The cache can be configured as a data cache, an instruction cache, or a single cache that is partitioned to contain data and instructions in different partitions.

In some embodiments, graphics pipeline 2020 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 2013 operates at the direction of hull shader 2011 and contains special purpose logic to generate a set of detailed geometric objects based on a coarse geometric model that is provided as input to graphics pipeline 2020. In some embodiments, if tessellation is not used, tessellation components (e.g., hull shader 2011, tessellator 2013, and domain shader 2017) can be bypassed.

In some embodiments, complete geometric objects can be processed by a geometry shader 2019 via one or more threads dispatched to execution units 2052A-2052B, or can proceed directly to the clipper 2029. In some embodiments, the geometry shader operates on entire geometric objects, rather than vertices or patches of vertices as in previous stages of the graphics pipeline. If the tessellation is disabled the geometry shader 2019 receives input from the vertex shader 2007. In some embodiments, geometry shader 2019 is programmable by a geometry shader program to perform geometry tessellation if the tessellation units are disabled.

Before rasterization, a clipper 2029 processes vertex data. The clipper 2029 may be a fixed function clipper or a programmable clipper having clipping and geometry shader functions. In some embodiments, a rasterizer and depth test component 2073 in the render output pipeline 2070 dispatches pixel shaders to convert the geometric objects into per pixel representations. In some embodiments, pixel shader logic is included in thread execution logic 2050. In some embodiments, an application can bypass the rasterizer and depth test component 2073 and access un-rasterized vertex data via a stream out unit 2023.

The graphics processor 2000 has an interconnect bus, interconnect fabric, or some other interconnect mechanism that allows data and message passing amongst the major components of the processor. In some embodiments, execution units 2052A-2052B and associated cache(s) 2051, texture and media sampler 2054, and texture/sampler cache 2058 interconnect via a data port 2056 to perform memory access and communicate with render output pipeline components of the processor. In some embodiments, sampler 2054, caches 2051, 2058 and execution units 2052A-2052B each have separate memory access paths.

In some embodiments, render output pipeline 2070 contains a rasterizer and depth test component 2073 that converts vertex-based objects into an associated pixel-based representation. In some embodiments, the rasterizer logic includes a windower/masker unit to perform fixed function triangle and line rasterization. An associated render cache 2078 and depth cache 2079 are also available in some embodiments. A pixel operations component 2077 performs pixel-based operations on the data, though in some instances, pixel operations associated with 2D operations (e.g. bit block image transfers with blending) are performed by the 2D engine 2041, or substituted at display time by the display controller 2043 using overlay display planes. In some embodiments, a shared L3 cache 2075 is available to all graphics components, allowing the sharing of data without the use of main system memory.

In some embodiments, graphics processor media pipeline 2030 includes a media engine 2037 and a video front-end 2034. In some embodiments, video front-end 2034 receives pipeline commands from the command streamer 2003. In some embodiments, media pipeline 2030 includes a separate command streamer. In some embodiments, video front-end 2034 processes media commands before sending the command to the media engine 2037. In some embodiments, media engine 2037 includes thread spawning functionality to spawn threads for dispatch to thread execution logic 2050 via thread dispatcher 2031.

In some embodiments, graphics processor 2000 includes a display engine 2040. In some embodiments, display engine 2040 is external to processor 2000 and couples with the graphics processor via the ring interconnect 2002, or some other interconnect bus or fabric. In some embodiments, display engine 2040 includes a 2D engine 2041 and a display controller 2043. In some embodiments, display engine 2040 contains special purpose logic capable of operating independently of the 3D pipeline. In some embodiments, display controller 2043 couples with a display device (not shown), which may be a system integrated display device, as in a laptop computer, or an external display device attached via a display device connector.

In some embodiments, graphics pipeline 2020 and media pipeline 2030 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Exemplary Additional Graphics Pipeline Programming

Figure 21A:
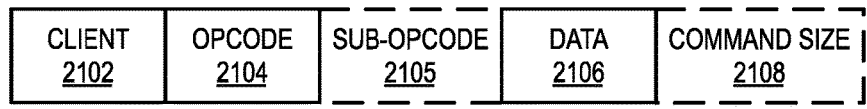
FIG. 21A-21B illustrate a graphics processor command format and command sequence, according to some embodiments.
Figure 21B:
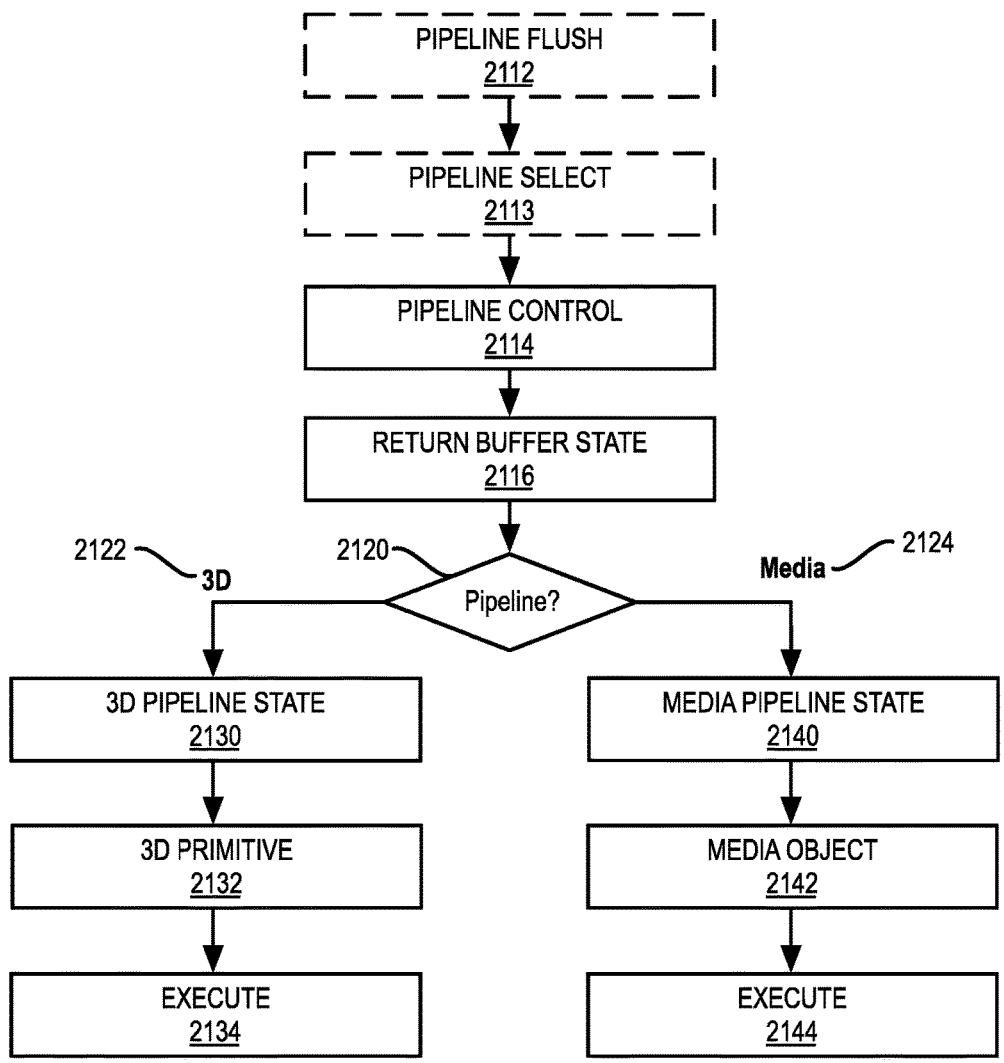

FIG. 21A is a block diagram illustrating a graphics processor command format 2100 according to some embodiments. FIG. 21B is a block diagram illustrating a graphics processor command sequence 2110 according to an embodiment. The solid lined boxes in FIG. 21A illustrate the components that are generally included in a graphics command while the dashed lines include components that are optional or that are only included in a sub-set of the graphics commands. The exemplary graphics processor command format 2100 of FIG. 21A includes data fields to identify a target client 2102 of the command, a command operation code (opcode) 2104, and the relevant data 2106 for the command. A sub-opcode 2105 and a command size 2108 are also included in some commands.

In some embodiments, client 2102 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2104 and, if present, sub-opcode 2105 to determine the operation to perform. The client unit performs the command using information in data field 2106. For some commands an explicit command size 2108 is expected to specify the size of the command. In some embodiments, the command parser automatically determines the size of at least some of the commands based on the command opcode. In some embodiments commands are aligned via multiples of a double word.

The flow diagram in FIG. 21B shows an exemplary graphics processor command sequence 2110. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2110 may begin with a pipeline flush command 2112 to cause any active graphics pipeline to complete the currently pending commands for the pipeline. In some embodiments, the 3D pipeline 2122 and the media pipeline 2124 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2112 can be used for pipeline synchronization or before placing the graphics processor into a low power state.

In some embodiments, a pipeline select command 2113 is used when a command sequence requires the graphics processor to explicitly switch between pipelines. In some embodiments, a pipeline select command 2113 is required only once within an execution context before issuing pipeline commands unless the context is to issue commands for both pipelines. In some embodiments, a pipeline flush command 2112 is required immediately before a pipeline switch via the pipeline select command 2113.

In some embodiments, a pipeline control command 2114 configures a graphics pipeline for operation and is used to program the 3D pipeline 2122 and the media pipeline 2124. In some embodiments, pipeline control command 2114 configures the pipeline state for the active pipeline. In one embodiment, the pipeline control command 2114 is used for pipeline synchronization and to clear data from one or more cache memories within the active pipeline before processing a batch of commands.

In some embodiments, return buffer state commands 2116 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2116 includes selecting the size and number of return buffers to use for a set of pipeline operations.

The remaining commands in the command sequence differ based on the active pipeline for operations. Based on a pipeline determination 2120, the command sequence is tailored to the 3D pipeline 2122 beginning with the 3D pipeline state 2130 or the media pipeline 2124 beginning at the media pipeline state 2140.

The commands to configure the 3D pipeline state 2130 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2130 commands are also able to selectively disable or bypass certain pipeline elements if those elements will not be used.

In some embodiments, 3D primitive 2132 command is used to submit 3D primitives to be processed by the 3D pipeline. Commands and associated parameters that are passed to the graphics processor via the 3D primitive 2132 command are forwarded to the vertex fetch function in the graphics pipeline. The vertex fetch function uses the 3D primitive 2132 command data to generate vertex data structures. The vertex data structures are stored in one or more return buffers. In some embodiments, 3D primitive 2132 command is used to perform vertex operations on 3D primitives via vertex shaders. To process vertex shaders, 3D pipeline 2122 dispatches shader execution threads to graphics processor execution units.

In some embodiments, 3D pipeline 2122 is triggered via an execute 2134 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2110 follows the media pipeline 2124 path when performing media operations. In general, the specific use and manner of programming for the media pipeline 2124 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2124 is configured in a similar manner as the 3D pipeline 2122. A set of commands to configure the media pipeline state 2140 are dispatched or placed into a command queue before the media object commands 2142. In some embodiments, commands for the media pipeline state 2140 include data to configure the media pipeline elements that will be used to process the media objects. This includes data to configure the video decode and video encode logic within the media pipeline, such as encode or decode format. In some embodiments, commands for the media pipeline state 2140 also support the use of one or more pointers to "indirect" state elements that contain a batch of state settings.

In some embodiments, media object commands 2142 supply pointers to media objects for processing by the media pipeline. The media objects include memory buffers containing video data to be processed. In some embodiments, all media pipeline states must be valid before issuing a media object command 2142. Once the pipeline state is configured and media object commands 2142 are queued, the media pipeline 2124 is triggered via an execute command 2144 or an equivalent execute event (e.g., register write). Output from media pipeline 2124 may then be post processed by operations provided by the 3D pipeline 2122 or the media pipeline 2124. In some embodiments, GPGPU operations are configured and executed in a similar manner as media operations.

Exemplary Graphics Software Architecture

Figure 22:
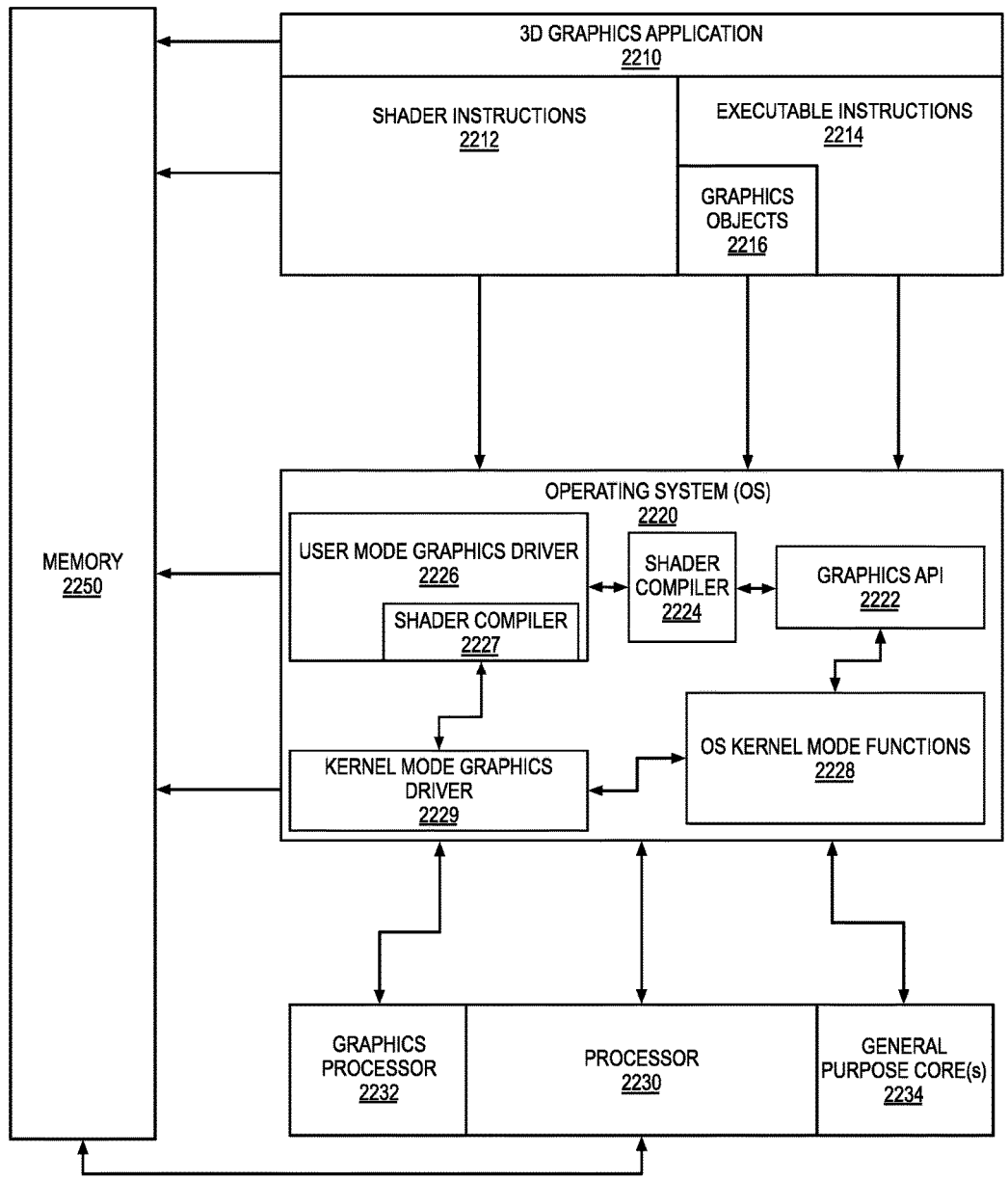
FIG. 22 illustrates exemplary graphics software architecture for a data processing system according to some embodiments.

FIG. 22 illustrates exemplary graphics software architecture for a data processing system 2200 according to some embodiments. In some embodiments, software architecture includes a 3D graphics application 2210, an operating system 2220, and at least one processor 2230. In some embodiments, processor 2230 includes a graphics processor 2232 and one or more general-purpose processor core(s) 2234. The graphics application 2210 and operating system 2220 each execute in the system memory 2250 of the data processing system.

In some embodiments, 3D graphics application 2210 contains one or more shader programs including shader instructions 2212. The shader language instructions may be in a high-level shader language, such as the High Level Shader Language (HLSL) or the OpenGL Shader Language (GLSL). The application also includes executable instructions 2214 in a machine language suitable for execution by the general-purpose processor core 2234. The application also includes graphics objects 2216 defined by vertex data.

In some embodiments, operating system 2220 is a Microsoft® Windows® operating system from the Microsoft Corporation, a proprietary UNIX-like operating system, or an open source UNIX-like operating system using a variant of the Linux kernel. The operating system 2220 can support a graphics API 2222 such as the Direct3D API, the OpenGL API, or the Vulkan API. When the Direct3D API is in use, the operating system 2220 uses a front-end shader compiler 2224 to compile any shader instructions 2212 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2210. In some embodiments, the shader instructions 2212 are provided in an intermediate form, such as a version of the Standard Portable Intermediate Representation (SPIR) used by the Vulkan API.

In some embodiments, user mode graphics driver 2226 contains a back-end shader compiler 2227 to convert the shader instructions 2212 into a hardware specific representation. When the OpenGL API is in use, shader instructions 2212 in the GLSL high-level language are passed to a user mode graphics driver 2226 for compilation. In some embodiments, user mode graphics driver 2226 uses operating system kernel mode functions 2228 to communicate with a kernel mode graphics driver 2229. In some embodiments, kernel mode graphics driver 2229 communicates with graphics processor 2232 to dispatch commands and instructions.

Exemplary IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 23:
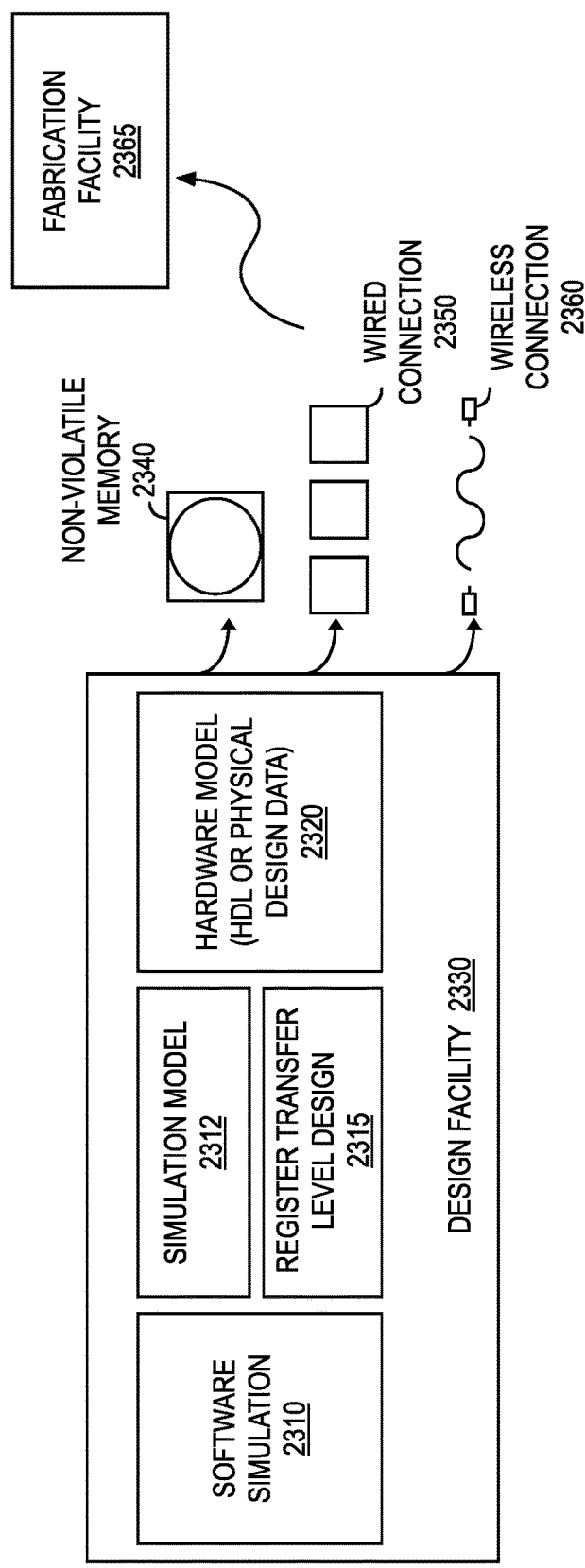
FIG. 23 is a block diagram illustrating an IP core development system, according to an embodiment.

FIG. 23 is a block diagram illustrating an IP core development system 2300 that may be used to manufacture an integrated circuit to perform operations according to an embodiment. The IP core development system 2300 may be used to generate modular, re-usable designs that can be incorporated into a larger design or used to construct an entire integrated circuit (e.g., an SOC integrated circuit). A design facility 2330 can generate a software simulation 2310 of an IP core design in a high level programming language (e.g., C/C++). The software simulation 2310 can be used to design, test, and verify the behavior of the IP core using a simulation model 2312. The simulation model 2312 may include functional, behavioral, and/or timing simulations. A register transfer level (RTL) design 2315 can then be created or synthesized from the simulation model 2312. The RTL design 2315 is an abstraction of the behavior of the integrated circuit that models the flow of digital signals between hardware registers, including the associated logic performed using the modeled digital signals. In addition to an RTL design 2315, lower-level designs at the logic level or transistor level may also be created, designed, or synthesized. Thus, the particular details of the initial design and simulation may vary.

The RTL design 2315 or equivalent may be further synthesized by the design facility into a hardware model 2320, which may be in a hardware description language (HDL), or some other representation of physical design data. The HDL may be further simulated or tested to verify the IP core design. The IP core design can be stored for delivery to a $3^{rd}$ party fabrication facility 2365 using non-volatile memory 2340 (e.g., hard disk, flash memory, or any non-volatile storage medium). Alternatively, the IP core design may be transmitted (e.g., via the Internet) over a wired connection 2350 or wireless connection 2360. The fabrication facility 2365 may then fabricate an integrated circuit that is based at least in part on the IP core design. The fabricated integrated circuit can be configured to perform operations in accordance with at least one embodiment described herein.

Exemplary System on a Chip Integrated Circuit

Figure 24:
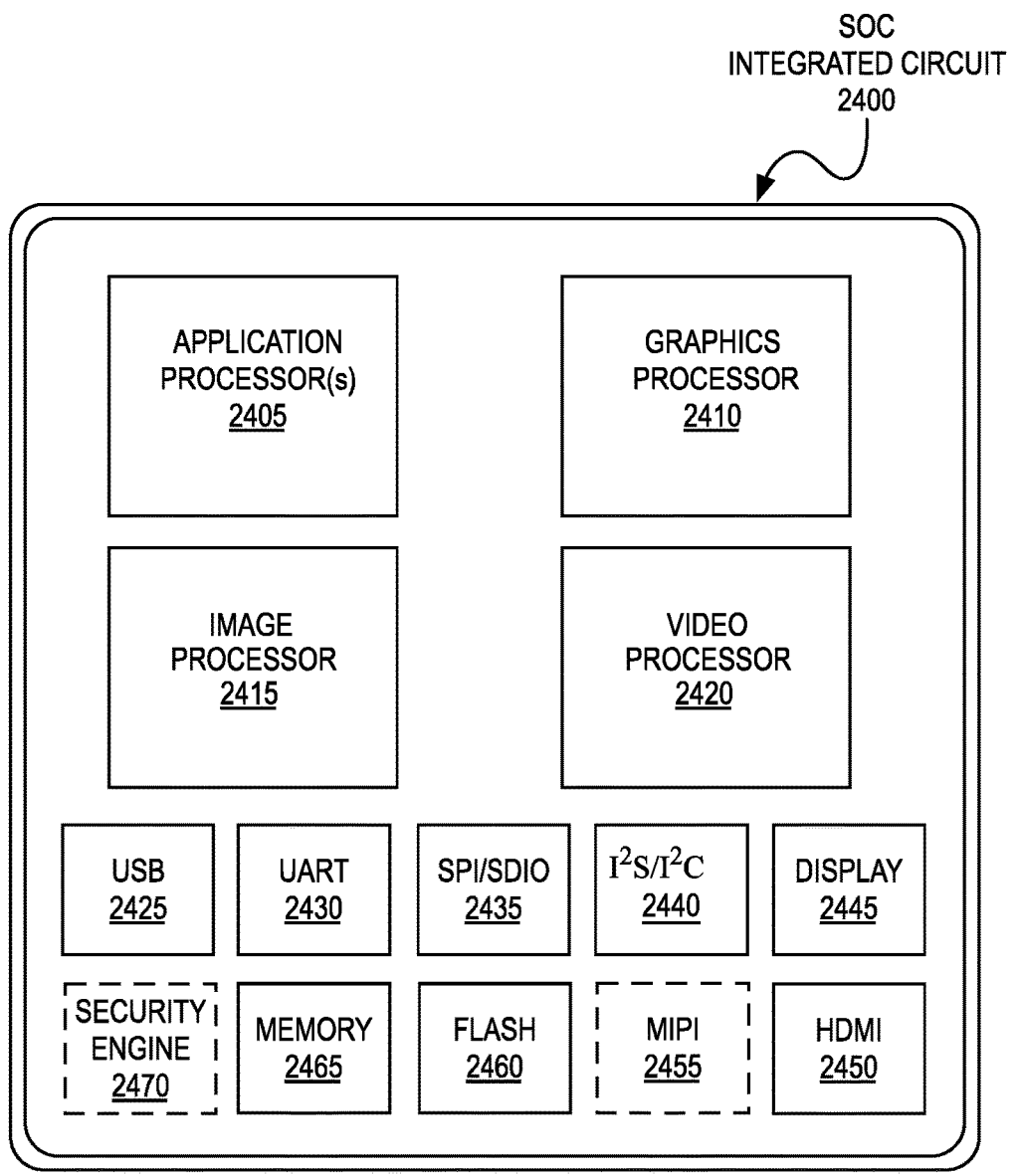
FIG. 24 is a block diagram illustrating an exemplary system on a chip integrated circuit, according to an embodiment.
Figure 25:
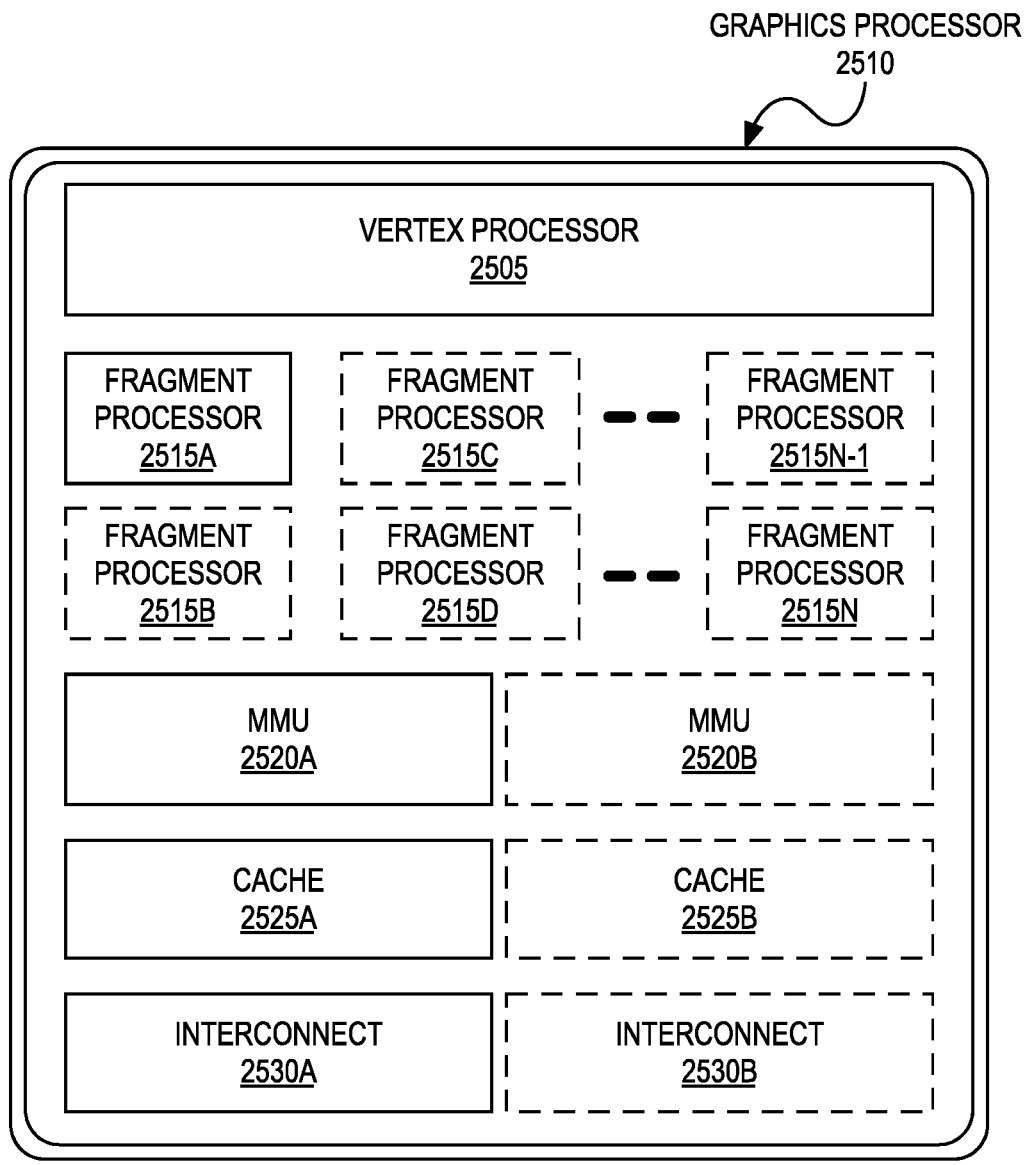
FIG. 25 is a block diagram illustrating an additional graphics processor, according to an embodiment.
Figure 26:
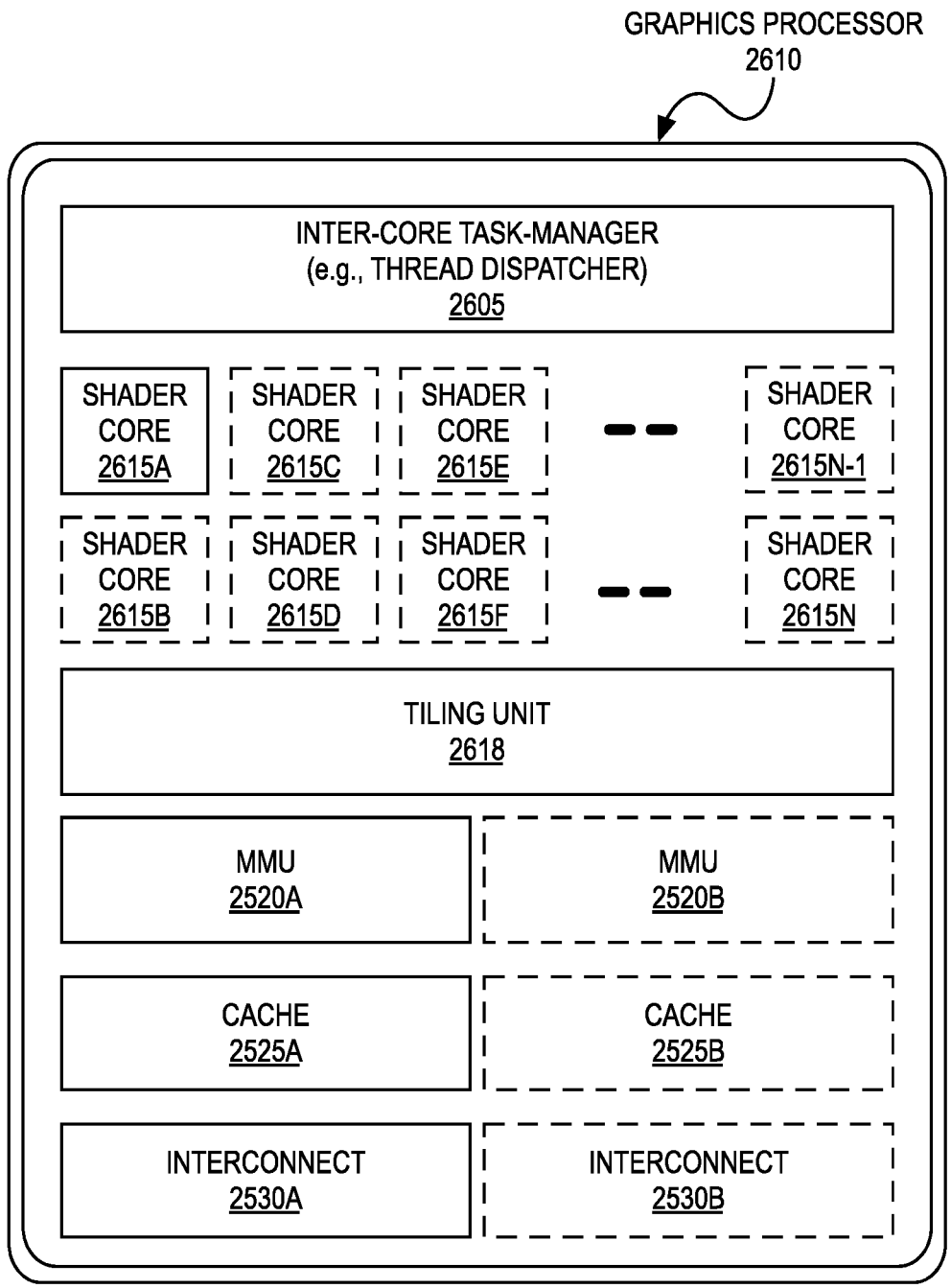
FIG. 26 is a block diagram illustrating an additional exemplary graphics processor of a system on a chip integrated circuit, according to an embodiment.

FIGS. 24-26 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 24 is a block diagram illustrating an exemplary system on a chip integrated circuit 2400 that may be fabricated using one or more IP cores, according to an embodiment. Exemplary integrated circuit 2400 includes one or more application processor(s) 2405 (e.g., CPUs), at least one graphics processor 2410, and may additionally include an image processor 2415 and/or a video processor 2420, any of which may be a modular IP core from the same or multiple different design facilities. Integrated circuit 2400 includes peripheral or bus logic including a USB controller 2425, UART controller 2430, an SPI/SDIO controller 2435, and an I²S/I²C controller 2440. Additionally, the integrated circuit can include a display device 2445 coupled to one or more of a high-definition multimedia interface (HDMI) controller 2450 and a mobile industry processor interface (MIPI) display interface 2455. Storage may be provided by a flash memory subsystem 2460 including flash memory and a flash memory controller. Memory interface may be provided via a memory controller 2465 for access to SDRAM or SRAM memory devices. Some integrated circuits additionally include an embedded security engine 2470.

FIG. 25 is a block diagram illustrating an exemplary graphics processor 2510 of a system on a chip integrated circuit that may be fabricated using one or more IP cores, according to an embodiment. Graphics processor 2510 can be a variant of the graphics processor 2410 of FIG. 24. Graphics processor 2510 includes a vertex processor 2505 and one or more fragment processor(s) 2515A-2515N (e.g., 2515A, 2515B, 2515C, 2515D, through 2515N-1, and 2515N). Graphics processor 2510 can execute different shader programs via separate logic, such that the vertex processor 2505 is optimized to execute operations for vertex shader programs, while the one or more fragment processor(s) 2515A-2515N execute fragment (e.g., pixel) shading operations for fragment or pixel shader programs. The vertex processor 2505 performs the vertex processing stage of the 3D graphics pipeline and generates primitives and vertex data. The fragment processor(s) 2515A-2515N use the primitive and vertex data generated by the vertex processor 2505 to produce a framebuffer that is displayed on a display device. In one embodiment, the fragment processor(s) 2515A-2515N are optimized to execute fragment shader programs as provided for in the OpenGL API, which may be used to perform similar operations as a pixel shader program as provided for in the Direct 3D API.

Graphics processor 2510 additionally includes one or more memory management units (MMUs) 2520A-2520B, cache(s) 2525A-2525B, and circuit interconnect(s) 2530A-2530B. The one or more MMU(s) 2520A-2520B provide for virtual to physical address mapping for integrated circuit 2510, including for the vertex processor 2505 and/or fragment processor(s) 2515A-2515N, which may reference vertex or image/texture data stored in memory, in addition to vertex or image/texture data stored in the one or more cache(s) 2525A-2525B. In one embodiment the one or more MMU(s) 2520A-2520B may be synchronized with other MMUs within the system, including one or more MMUs associated with the one or more application processor(s) 2405, image processor 2415, and/or video processor 2420 of FIG. 24, such that each processor 2405-2420 can participate in a shared or unified virtual memory system. The one or more circuit interconnect(s) 2530A-2530B enable graphics processor 2510 to interface with other IP cores within the SoC, either via an internal bus of the SoC or via a direct connection, according to embodiments.

FIG. 26 is a block diagram illustrating an additional exemplary graphics processor 2610 of a system on a chip integrated circuit that may be fabricated using one or more IP cores, according to an embodiment. Graphics processor 2610 can be a variant of the graphics processor 2410 of FIG. 24. Graphics processor 2610 includes the one or more MMU(s) 2520A-2520B, caches 2525A-2525B, and circuit interconnects 2530A-2530B of the integrated circuit 2500 of FIG. 25.

Graphics processor 2610 includes one or more shader core(s) 2615A-2615N (e.g., 2615A, 2615B, 2615C, 2615D, 2615E, 2615F, through 2615N-1, and 2615N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2610 includes an inter-core task manager 2605, which acts as a thread dispatcher to dispatch execution threads to one or more shader cores 2615A-2615N and a tiling unit 2618 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a parallel processor comprising a processing array within the parallel processor, the processing array including multiple compute blocks, each compute block including multiple processing clusters configured for parallel operation, and each of the multiple compute blocks is independently preemptable. In one embodiment the parallel processor is a GPGPU configured for SIMT execution. In one embodiment the parallel processor includes a scheduler module to schedule a workload to the multiple compute blocks. The scheduler module can be an embedded microcontroller. In one embodiment the multiple compute blocks include a first compute block and a second compute block. The first compute block can be configured to preempt a first work group of the workload while the second compute block is to execute a second work group of the workload. In one embodiment the processing array is configured to address memory via a virtual address mapping and is configured to support page faulting for the virtual address mapping. The first compute block can be configured to detect that a first work group has a number of unhandled page faults over a threshold, halt execution of the first work group, and save a context state for the first work group. In one embodiment the parallel processor additionally includes a context save memory to store a context state for each of the multiple compute blocks and the first compute block is to save the context state for the first work group to the context save memory. In one embodiment the context save memory is dedicated to the first compute block.

In one embodiment the first compute block and a second compute block share a set of shared assets within the processing array. The set of shared assets can include a texture unit, a texture sampler, and a cache memory. The set of shared assets can also include an address generation unit and an address mapping unit. In one embodiment the context state for the first work group includes context state for the set of shared assets.

One embodiment provides for a method of workload management on a parallel processor, the method comprising, in response to receiving a notice that a number of page faults associated with a first work group on a first compute block within the parallel processor has exceeded a threshold, placing the first compute block into a preemption state when page fault preemption is enabled for the context associated with the first work group. The method additionally includes determining if a first pending workgroup is available for execution on the first compute block, preempting the first work group on the first compute block when the first pending workgroup is available for execution on the first compute block, and executing a second work group on a second compute block within the parallel processor while preempting the first work group, wherein the first compute block and the second compute block each include multiple processing clusters, each of the multiple processing clusters including multiple processing units. In one embodiment the method additionally includes enabling page fault preemption for the context associated with the first work group when an average page fault latency for the context is above a high-watermark threshold and disabling page fault preemption for the context when the average page fault latency for the context is below a low-watermark threshold. In one embodiment, placing the first compute block into the preemption state includes saving a hardware context state associated with the first compute block to a context save memory and saving the hardware context state associated with the first compute block to the context save memory includes saving a context state associated with at least the first work group.

One embodiment provides for a method of workload management on a general-purpose graphics processing unit (GPGPU), the method comprising compiling source code for execution on the GPGPU to generate compiled source code. While compiling the source code, a compiler can generate metadata associated with one or more instructions of the compiled source code, where the metadata is to indicate a size of a context save state when preempting execution at the one or more instructions. In one embodiment the metadata includes a preemption hint that indicates an register file usage or a pending change in the register file usage in the next set of instructions.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A parallel processor comprising:
   a processing array within the parallel processor, the processing array including multiple compute blocks, each compute block including multiple processing clusters to perform parallel operations, the processing array to address memory via a virtual address mapping and support page faulting for the virtual address mapping, wherein each of the multiple compute blocks is independently preemptable; and a scheduler to schedule a workload to the multiple compute blocks, wherein the scheduler is to track an average latency to resolve a page fault.

2. The parallel processor as in claim 1, wherein the parallel processor is a general-purpose graphics processing unit (GPGPU).

3. The parallel processor as in claim 2, wherein the parallel processor is a single instruction multiple thread (SIMT) processor.

4. The parallel processor as in claim 1, wherein the scheduler is an embedded microcontroller.

5. The parallel processor as in claim 1, wherein the multiple compute blocks include a first compute block and a second compute block.

6. The parallel processor as in claim 5, wherein the first compute block is to preempt a first work group of the workload while the second compute block is to execute a second work group of the workload.

7. The parallel processor as in claim 5, wherein the first compute block is to detect that a first work group of the workload has a number of unhandled page faults over a threshold, halt execution of the first work group, and save a context state for the first work group.

8. The parallel processor as in claim 7, additionally including a context save memory to store the context state for each of the multiple compute blocks, wherein the first compute block is to save the context state for the first work group to the context save memory.

9. The parallel processor as in claim 8, wherein the first compute block is to save the context state for the first work group to a region of the context save memory that is dedicated to the first compute block.

10. A data processing system comprising:
a memory;
a parallel processor coupled with the memory, the parallel processor including a processing array, wherein the processing array is to address memory via a virtual address mapping and support page faulting for the virtual address mapping, the processing array including:
  multiple compute blocks including multiple processing clusters to perform parallel operations, wherein each of the multiple compute blocks is independently preemptable; and
  a scheduler to schedule a workload to the multiple compute blocks, wherein the scheduler is to track an average latency to resolve a page fault.

11. The data processing system as in claim 10, wherein the parallel processor is a general-purpose graphics processing unit (GPGPU).

12. The data processing system as in claim 11, wherein the parallel processor is a single instruction multiple thread (SIMT) processor.

13. The data processing system as in claim 12, wherein scheduler module is an embedded microcontroller.

14. The data processing system as in claim 10, wherein the multiple compute blocks include a first compute block and a second compute block.

15. The data processing system as in claim 14, wherein the first compute block is to preempt a first work group of the workload while the second compute block is to execute a second work group of the workload.

16. The data processing system as in claim 10, wherein a first compute block of the multiple compute blocks is to detect that a first work group has a number of unhandled page faults over a threshold, halt execution of the first work group, and save a context state for the first work group.

17. The data processing system as in claim 16, additionally including a context save memory to store the context state for each of the multiple compute blocks, wherein the first compute block is to save the context state for the first work group to the context save memory.

18. The data processing system as in claim 17, wherein the first compute block is to save the context state for the first work group to a region of the context save memory that is dedicated to the first compute block.

19. A method implemented on a parallel processor, the method comprising:
generating virtual address mapping for a processing array within the parallel processor, the processing array to address memory via the virtual address mapping and support page faulting for the virtual address mapping, wherein the processing array includes multiple compute blocks, each of the multiple compute blocks is independently preemptable, and each compute block includes multiple processing clusters to perform parallel operations;
scheduling a workload to one or more of the multiple compute blocks; and
tracking an average latency to resolve a page fault for the workload.

20. The method as in claim 19, additionally comprising:
detecting that a first work group of the workload has a number of unhandled page faults over a threshold;
halting execution of the first work group; and
saving a context state for the first work group.

* * * * *